United States Patent
Getsin et al.

(10) Patent No.: US 6,529,949 B1
(45) Date of Patent: Mar. 4, 2003

(54) SYSTEM, METHOD AND ARTICLE OF MANUFACTURE FOR REMOTE UNLOCKING OF LOCAL CONTENT LOCATED ON A CLIENT DEVICE

(75) Inventors: Evgeniy M. Getsin, Englewood, CO (US); Allan B. Lamkin, San Diego, CA (US); Todd R. Collart, Los Altos, CA (US)

(73) Assignee: Interactual Technologies, Inc., San Jose, CA (US)

( * ) Notice: Subject to any disclaimer, the term of this patent is extended or adjusted under 35 U.S.C. 154(b) by 0 days.

(21) Appl. No.: 09/499,247

(22) Filed: Feb. 7, 2000

(51) Int. Cl.[7] ............................................. G06F 15/16
(52) U.S. Cl. ..................... 709/217; 709/218; 380/202; 380/229
(58) Field of Search ................. 709/217, 218, 709/224, 225, 203; 380/4, 202, 229

(56) References Cited

U.S. PATENT DOCUMENTS

| | | | |
|---|---|---|---|
| 5,413,383 A | | 5/1995 | Laurash et al. |
| 5,640,453 A | * | 6/1997 | Schuchman et al. |
| 5,640,560 A | | 6/1997 | Smith |
| 5,734,898 A | * | 3/1998 | He .............................. 707/203 |
| 5,790,753 A | * | 8/1998 | Krishnamoorthy et al. . 348/461 |
| 5,822,291 A | | 10/1998 | Brindze et al. ................ 369/94 |
| 5,857,021 A | | 1/1999 | Kataoka et al. |
| 5,875,296 A | * | 2/1999 | Shi et al. ................ 395/188.01 |
| 5,878,233 A | * | 3/1999 | Schloss .......................... 705/39 |
| 5,892,825 A | | 4/1999 | Mages et al. |
| 5,913,210 A | | 6/1999 | Call |
| 5,915,093 A | | 6/1999 | Berlin et al. |
| 5,930,767 A | | 7/1999 | Reber et al. |
| 5,933,497 A | * | 8/1999 | Beetcher et al. ............... 705/59 |
| 5,943,304 A | | 8/1999 | Kamada et al. |
| 5,956,482 A | * | 9/1999 | Agraharam et al. ......... 345/326 |
| 5,978,773 A | | 11/1999 | Hudetz et al. |
| 5,987,525 A | | 11/1999 | Roberts et al. |

(List continued on next page.)

OTHER PUBLICATIONS

Henry M. Gladney, "Safeguarding Digital Library Contents and Users: Document Access Control", Dlib Magazine, hffp://www.dlib.org/dlib/june97/ibm/06gladdney.html, Jun. 1997.*

Edgar Weipp, "An Approach to Role–Based Access Control for Digital Content", 2001, IEEE, pp. 290–294.*

David Doering, NSM Galaxy Jukebox, E Media Professionals Reviews, ( pp. 78–80).

*Primary Examiner*—Krisna Lim
(74) *Attorney, Agent, or Firm*—Fitch, Even, Tabin & Flannery

(57) ABSTRACT

A system, method and article of manufacture are provided for remotely controlling content stored on a local computer connected to a network system such as the Internet. The invention allows content such as DVD Video content to be locked so that play can only be accomplished through verification of user identity and also allows augmentation and supplementation of the content provided by the video from a remote server. In addition, upon verification of user client credentials, the present invention allows the locally stored content to be supplemented with additional content delivered over the network system. Furthermore, the present invention allows content stored locally on a client device to be remotely controlled to play synchronously on a plurality of client devices.

28 Claims, 26 Drawing Sheets

U.S. PATENT DOCUMENTS

| | | | | |
|---|---|---|---|---|
| 5,991,399 A | * | 11/1999 | Graunke et al. | 380/228 |
| 5,995,965 A | * | 11/1999 | Experton | 707/10 |
| 6,016,166 A | | 1/2000 | Huang et al. | 348/515 |
| 6,018,768 A | | 1/2000 | Ullman et al. | 709/218 |
| 6,034,937 A | | 3/2000 | Kumagai | |
| 6,044,403 A | | 3/2000 | Gerszberg et al. | 709/225 |
| 6,052,717 A | * | 4/2000 | Reynolds et al. | 707/203 |
| 6,052,785 A | * | 4/2000 | Lin et al. | 713/201 |
| 6,055,314 A | | 4/2000 | Spies et al. | 380/21 |
| 6,061,057 A | | 5/2000 | Knowlton et al. | |
| 6,101,534 A | | 8/2000 | Rothschild | |
| 6,134,593 A | | 10/2000 | Alexander et al. | |
| 6,138,150 A | * | 10/2000 | Nichols et al. | 709/219 |
| 6,145,006 A | * | 11/2000 | Vishlitsky et al. | 709/229 |
| 6,154,738 A | | 11/2000 | Call | |
| 6,154,844 A | * | 11/2000 | Touboul et al. | 713/164 |
| 6,157,953 A | * | 12/2000 | Chang et al. | 709/225 |
| 6,182,222 B1 | | 1/2001 | Oparaji | |
| 6,189,032 B1 | * | 2/2001 | Susaki et al. | 709/225 |
| 6,219,675 B1 | * | 4/2001 | Pal et al. | 707/1 |
| 6,226,235 B1 | | 5/2001 | Wehmeyer | |
| 6,229,523 B1 | | 5/2001 | Czako | |
| 6,230,174 B1 | | 5/2001 | Berger et al. | |
| 6,233,618 B1 | * | 5/2001 | Shannon | 707/10 |
| 6,239,793 B1 | | 5/2001 | Barnert et al. | |
| 6,243,692 B1 | * | 6/2001 | Floyd et al. | 705/59 |
| 6,289,165 B1 | | 9/2001 | Abecassis | |
| 6,301,661 B1 | * | 10/2001 | Shambroom | 713/168 |
| 6,331,865 B1 | * | 12/2001 | Sachs et al. | 345/741 |
| 6,374,402 B1 | * | 4/2002 | Schmeidler et al. | 345/749 |

* cited by examiner

SYSTEM, METHOD AND ARTICLE OF MANUFACTURE FOR REMOTE UNLOCKING OF LOCAL CONTENT LOCATED ON A CLIENT DEVICE

FIELD OF THE INVENTION

The present invention relates to remote control of content stored locally on a client device such as a computer or set top box connected to a network system, and more particularly to remote control of DVD Video content on such a device.

BACKGROUND OF THE INVENTION

Multimedia computer systems have become increasingly popular over the last several years due to their versatility and their interactive presentation style. A multimedia computer system can be defined as a computer system having a combination of video and audio outputs for presentation of audio-visual displays. A modern multimedia computer system typically includes one or more storage devices such as an optical drive, a CD-ROM, a hard drive, a videodisc, or an audiodisc, and audio and video data are typically stored on one or more of these mass storage devices. In some file formats the audio and video are interleaved together in a single file, while in other formats the audio and video data are stored in different files, many times on different storage media. Audio and video data for a multimedia display may also be stored in separate computer systems that are networked together. In this instance, the computer system presenting the multimedia display would receive a portion of the necessary data from the other computer system via the network cabling.

Graphic images used in Windows multimedia applications can be created in either of two ways, these being bit-mapped images and vector-based images. Bit-mapped images comprise a plurality of picture elements (pixels) and are created by assigning a color to each pixel inside the image boundary. Most bit-mapped color images require one byte per pixel for storage, so large bit-mapped images create correspondingly large files. For example, a full-screen, 256-color image in 640-by-480-pixel VGA mode requires 307,200 bytes of storage, if the data is not compressed. Vector-based images are created by defining the end points, thickness, color, pattern and curvature of lines and solid objects comprised within the image. Thus, a vector-based image includes a definition which consists of a numerical representation of the coordinates of the object, referenced to a corner of the image.

Bit-mapped images are the most prevalent type of image storage format, and the most common bit-mapped-image file formats are as follows. A file format referred to as BMP is used for Windows bit-map files in 1-, 2-, 4-, 8-, and 24-bit color depths. BMP files contain a bit-map header that defines the size of the image, the number of color planes, the type of compression used (if any), and the palette used. The Windows DIB (device-independent bit-map) format is a variant of the BMP format that includes a color table defining the RGB (red green blue) values of the colors used. Other types of bit-map formats include the TIF (tagged image format file), the PCX (Zsoft Personal Computer Paintbrush Bitmap) file format, the GIF (graphics interchange file) format, and the TGA (Texas Instruments Graphic Architecture) file format.

The standard Windows format for bit-mapped images is a 256-color device-independent bit map (DIB) with a BMP (the Windows bit-mapped file format) or sometimes a DIB extension. The standard Windows format for vector-based images is referred to as WMF (Windows meta file).

Full-motion video implies that video images shown on the computer's screen simulate those of a television set with identical (30 frames-per-second) frame rates, and that these images are accompanied by high-quality stereo sound. A large amount of storage is required for high-resolution color images, not to mention a full-motion video sequence. For example, a single frame of NTSC video at 640-by-400-pixel resolution with 16-bit color requires 512K of data per frame. At 30 flames per second, over 15 Megabytes of data storage are required for each second of full motion video. Due to the large amount of storage required for full motion video, various types of video compression algorithms are used to reduce the amount of necessary storage. Video compression can be performed either in real-time, i.e., on the fly during video capture, or on the stored video file after the video data has been captured and stored on the media. In addition, different video compression methods exist for still graphic images and for full-motion video.

Examples of video data compression for still graphic images are RLE (run-length encoding) and JPEG (Joint Photographic Experts Group) compression. RLE is the standard compression method for Windows BMP and DIB files. The RLE compression method operates by testing for duplicated pixels in a single line of the bit map and stores the number of consecutive duplicate pixels rather than the data for the pixel itself. JPEG compression is a group of related standards that provide either lossless (no image quality degradation) or lossy (imperceptible to severe degradation) compression types. Although JPEG compression was designed for the compression of still images rather than video, several manufacturers supply JPEG compression adapter cards for motion video applications.

In contrast to compression algorithms for still images, most video compression algorithms are designed to compress full motion video. Video compression algorithms for motion video generally use a concept referred to as interframe compression, which involves storing only the differences between successive frames in the data file. Interframe compression begins by digitizing the entire image of a key frame. Successive frames are compared with the key frame, and only the differences between the digitized data from the key frame and from the successive frames are stored. Periodically, such as when new scenes are displayed, new key frames are digitized and stored, and subsequent comparisons begin from this new reference point. It is noted that interframe compression ratios are content-dependent, i.e., if the video clip being compressed includes many abrupt scene transitions from one image to another, the compression is less efficient. Examples of video compression which use an interframe compression technique are MPEG, DVI and MPEG (Moving Pictures Experts Group) compression is a set of methods for compression and decompression of full motion video images that uses the interframe compression technique described above. The MPEG standard requires that sound be recorded simultaneously with the video data, and the video and audio data are interleaved in a single file to attempt to maintain the video and audio synchronized during playback. The audio data is typically compressed as well, and the MPEG standard specifies an audio compression method referred to as ADPCM (Adaptive Differential Pulse Code Modulation) for audio data.

A standard referred to as Digital Video Interactive (DVI) format developed by Intel Corporation is a compression and storage format for full-motion video and high-fidelity audio data. The DVI standard uses interframe compression techniques similar to that of the MPEG standard and uses ADPCM compression for audio data. The compression method used in DVI is referred to as RTV 2.0 (real time video), and this compression method is incorporated into Intel's AVK (audio/video kernel) software for its DVI product line. IBM has adopted DVI as the standard for displaying video for its Ultimedia product line. The DVI file format is based on the Intel i750 chipset and is supported through the Media Control Interface (MCI) for Windows. Microsoft and Intel jointly announced the creation of the DV MCI (digital video media control interface) command set for Windows 3.1 in 1992.

The Microsoft Audio Video Interleaved (AVI) format is a special compressed file structure format designed to enable video images and synchronized sound stored on CD-ROMs to be played on PCs with standard VGA displays and audio adapter cards. The AVI compression method uses an interframe method, i.e., the differences between successive frames are stored in a manner similar to the compression methods used in DVI and MPEG. The AVI format uses symmetrical software compression-decompression techniques, i.e., both compression and decompression are performed in real time. Thus AVI files can be created by recording video images and sound in AVI format from a VCR or television broadcast in real time, if enough free hard disk space is available.

As discussed above, such audio and video content is often stored on media such as CD-ROM or digital video disc (DVD). However, once a vendor has delivered such content to a customer, the vendor loses any practical control over the product. Even if the product is delivered under license rather than out right sale, it has traditionally been difficult to prevent a customer from copying the content or providing the content to any number of friends so that they might illegally copy the content.

Another problem which arises from the vendors loss of control of the content maintenance and updating of the software. If content is to be added or modified, the vendor must send a new disc to the customer. In addition, the vendor can not control the amount of data which the customer can access. In other words, once the disc is delivered, the customer will have access to all of the content on the disc and only that content. Time sensitive content, such as advertising, can become obsolete but will still be accessible on the disc.

Therefore, there remains a need for a system method or apparatus allowing flexible control of content delivered to a client. Such a system, method or apparatus would preferably allow content to be initially delivered on a traditional recording medium such as a CD-ROM or DVD but would allow a vendor to remote control the access of a user to the content stored thereon. Furthermore, such a system would preferably allow a vendor to supplement and/or modify the content and could allow the vendor to limit a client's access to certain portions of the locally stored content if desired. Furthermore, remote control of navigation would be preferably and could facilitate simultaneous access by a controlled number of multiple clients if desired.

SUMMARY OF THE INVENTION

A system, method and article of manufacture are provided for remotely controlling local content for local access and use by a client device. An input is received from the client which can allow a transaction server to identify the client. Once the client has been identified a command can be sent to the client which controls the manner in which the client device can use and access the local content.

The local content can be embodied on a digital video disk, and commands generated by the transaction server can be in the form of an unlock sequence which allows the client device to access and use the content stored on the disk. In addition, commands from the transaction server can be used to navigate the content stored on the disk and can even supplement the content stored thereon. The transaction server can, in response to a client identification, unlock content stored remotely on the transaction server, allowing content to be easily maintained and updated remotely at a single transaction site without having to replace many DVD disks being used by many different clients.

In another embodiment of the invention, the present invention can remotely control synchronous play of the locally stored content at a plurality of client devices. This can be accomplished, for example through use of a synchronization server used in conjunction with the transaction server. Alternatively, the transaction server can perform both functions, that of a transaction server as well as that of a synchronization server.

BRIEF DESCRIPTION OF THE DRAWINGS

The invention will be better understood when consideration is given to the following detailed description thereof. Such description makes reference to the annexed drawings wherein.

DETAILED DESCRIPTION OF THE PREFERRED EMBODIMENTS

FIGS. 1–26 illustrate a system for remotely controlling content stored locally on a client apparatus. Prior to use, an event is stored in memory on at least one client apparatuse. Such client apparatus is adapted to be connected to a network along with a host computer(s). In operation, information is transmitted from the host computer to the at least one client apparatus utilizing the network. This information controls playback of the event stored on locally on the client computer.

In various embodiments, the client apparatus may take the form of a computer, television, stereo, home appliance, or any other types of devices. In one embodiment, the client apparatuses and the host computer each include a computer such as an IBM compatible computer, Apple Macintosh computer or UNIX based workstation.

Figure 1:
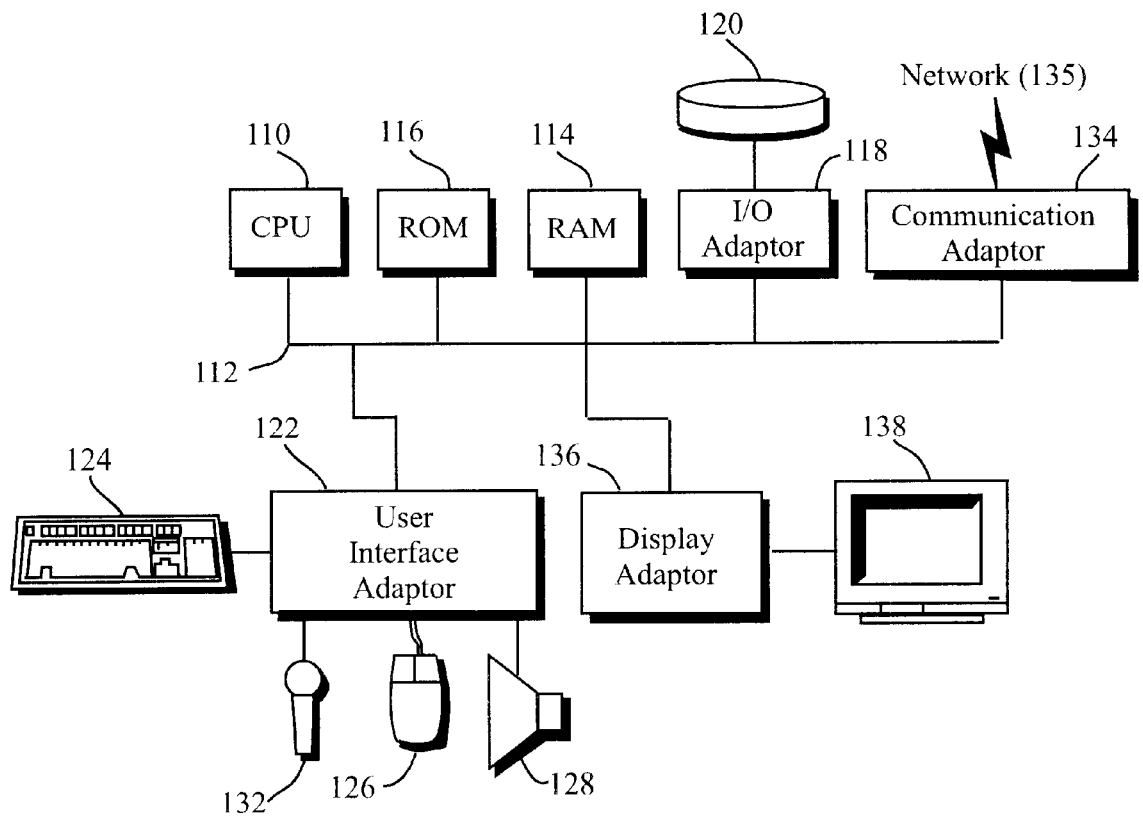
FIG. 1 is a schematic diagram of a hardware implementation of one embodiment of the present invention.

A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 (i.e. DVD playback device) to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided. OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others' capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism; and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++, appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (Nov. 1995); and R. Fielding, H, Frystyk, T. Berners-Lee, J. Gettys and J. C. Mogul, "Hypertext Transfer Protocol HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Synchronization Overview

Figure 2:
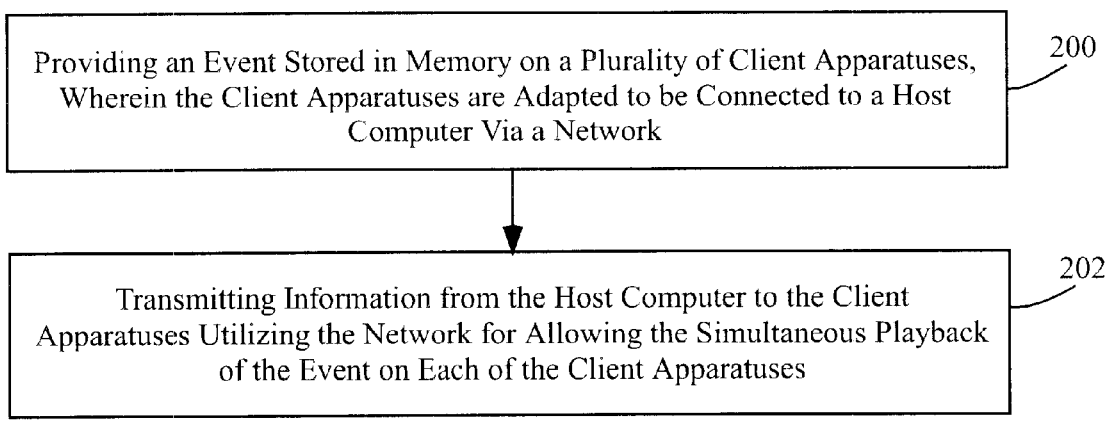
FIG. 2 illustrates a flowchart delineating a method for synchronizing an event on a plurality of client apparatuses in accordance with one embodiment of the present invention.

FIG. 2 illustrates a flowchart delineating a method for synchronizing an event on a plurality of client apparatuses. First, in operation 200, an event is stored in memory on at least one of the client apparatuses. In various embodiments, the memory may take the form of an electromagnetic medium, or any type of optical storage device, i.e. CD-audio. In a primary aspect of the present invention, the memory includes a digital video disc (DVD) (audio or video). Further, for reasons that will soon become apparent, the information includes chapter information associated with the DVD. In such embodiment where the memory is portable, the user may be required to purchase the memory, i.e. DVD, in order to participate in a synchronized event, thus increasing the sale of DVD's.

It should be noted that the event need not be necessarily stored in memory on all of the client apparatuses, but rather stored on one or some of the client apparatuses and streamed to the remaining client apparatuses at variant rates. This may be feasibly accomplished if the client apparatus(es) containing the stored event has a high-bandwidth connection with the remaining client apparatuses. For example, the client apparatus(es) containing the stored event may include a server that has a connection to a plurality of televisions via a cable network, i.e. WEBTV. Similar functionality may be achieved via a broadcast medium. The present invention is thus flexible by having an ability to host user events and corporative events.

In one embodiment, the event includes a video and audio presentation such as movie, a concert, and/or a theatrical event. It should be noted, however, that the event may included any recording capable of being played back for entertainment, education, informative or other similar purposes.

In use, the client apparatuses and a host computer are adapted to be connected to a network. Such network may include a wide, local or any other type of communication network. For example, a wide area network such as the Internet may be employed which operates using TCP/IP or IPX protocols.

In operation 202, information is transmitted from the host computer to the appropriate client apparatuses utilizing the network. This information allows for the simultaneous and synchronous playback of the event on each of the client apparatuses. In one embodiment, the information may also include a start time when the playback of the event is to begin on each of the client apparatuses. Further, an ending time may be included when the playback of the event is to end on each of the client apparatuses. Still yet, "play" command information may be sent to the client apparatuses at the start time. As an option, input may be received from the user, and used to alter the playback of the event. The host server, or synchronization server, can also control various streams of a variant rate and different hardware associated with those streams.

The present invention thus has the ability to synchronize video playback for one or multiple (thousands) users from one or multiple physical locations, and to synchronize with external video, audio and/or data streams.

Users of the present invention are at multiple physical locations and host servers may also be at different locations. The present invention is thus a scalable system which is capable of servicing an unlimited number of users. Since the content is local to the user machine, no high network bandwidth is required.

History Download Capabilities

Figure 3:
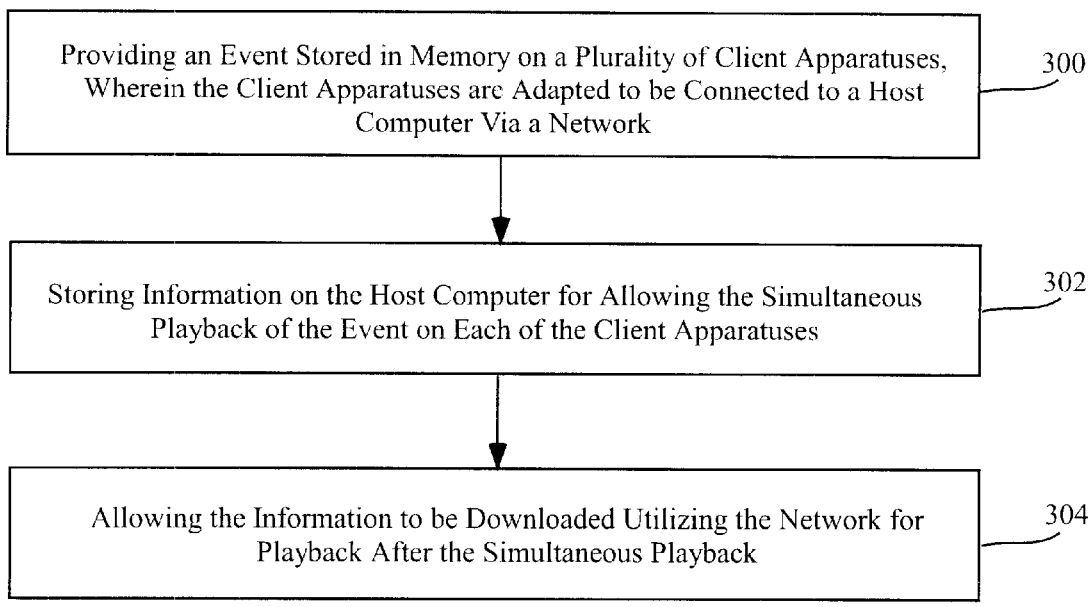
FIG. 3 illustrates a flowchart delineating a method for storing synchronization information for subsequent playback of an event in accordance with one embodiment of the present invention.

FIG. 3 illustrates a flowchart delineating a method for storing synchronization information for subsequent playback of an event. Initially, in operation 300, an event is stored in memory on at least one of the client apparatuses, as set forth earlier. These client apparatuses are adapted to be connected to a network along with a host computer during use.

In operation 302, information is stored on the host computer(s) for allowing the simultaneous playback of the event on each of the client apparatuses. In one embodiment, the information may include a history and data associated with the synchronous playback. In particular, the history may include any overlaid material(as will be described hereinafter in greater detail), any specific commands affecting the playback of the information, or any other type of general information, i.e. start time, end time, etc.

In operation 304, the information may be downloaded utilizing the network at any time after the synchronous playback of the event. Such downloaded information may then be used for playback after the simultaneous playback of the event. As such, the present invention has the ability to allow users to download a history and data associated with a particular synchronization event and play it later.

Overlay Synchronization

Figure 4:
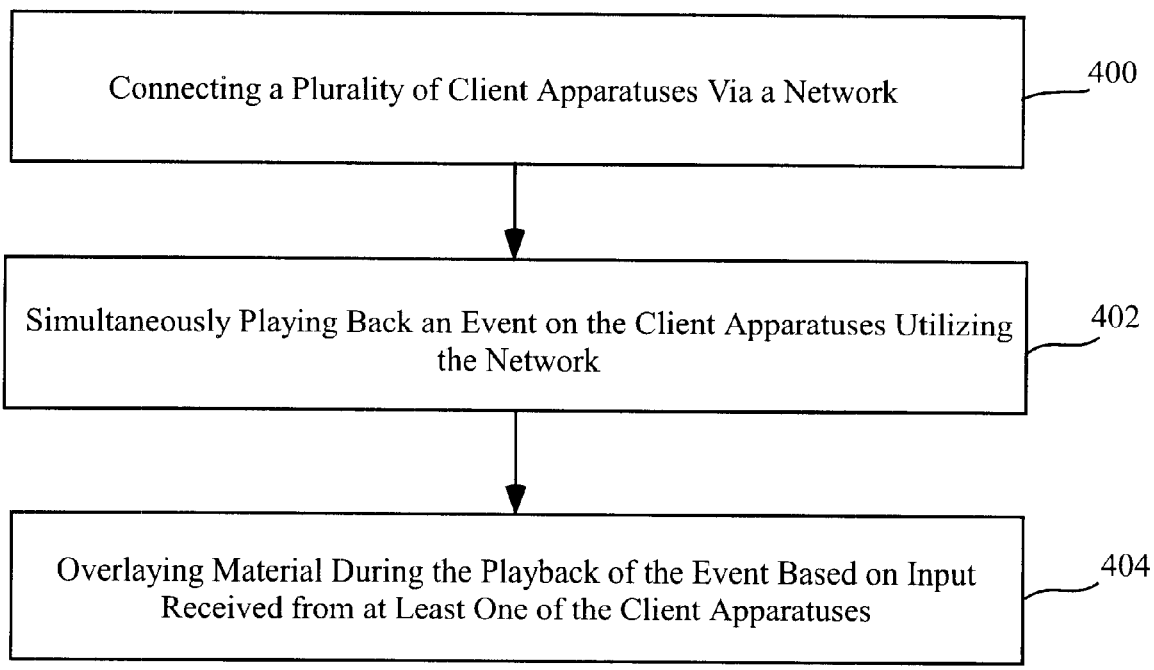
FIG. 4 illustrates a flowchart setting forth a method for providing overlays during a synchronized event on a plurality of client apparatuses in accordance with one embodiment of the present invention.

FIG. 4 illustrates a flowchart setting forth a method for providing overlays during a synchronized event on a plurality of client apparatuses or any other source. First, in operation 400, a plurality of client apparatuses are connected via a network. In operation 402, an event may be simultaneously played back on the client apparatuses utilizing the network, as set forth earlier.

During the playback of the event, visual and/or audio material may also be overlaid on the event based on input received from at least one of the client apparatuses. See operation 404. This may be accomplished by transmitting the overlay material from one of the client apparatuses to the host computer or any other server, and multicasting the same to the remaining client apparatuses.

As an option, the overlay material may include annotations on a display of the client apparatus. For example, the overlay material may include sketches which are inputted by way of a stylus-based input screen or a keyboard or the like, along with a voiceover inputted by way of a microphone or voice synthesizer. Such capability may also be quite valuable in an educational environment.

In one embodiment, the overlay material may also be displayed on each of the client apparatuses utilizing the network. This allows each of the users to experience the overlay in real-time during the simultaneous playback of the event. As an option, the user inputting the overlay material may select which users may experience the overlay material. The client apparatus that provided the overlay material may also be identified to the users experiencing the overlay material.

It should be noted that various bi-directional communication may be enabled for allowing data to travel to and from the server. For instance, the playback of the event on the client apparatuses may be altered in any feasible way based on input from a user.

Late Synchronization

Figure 5:
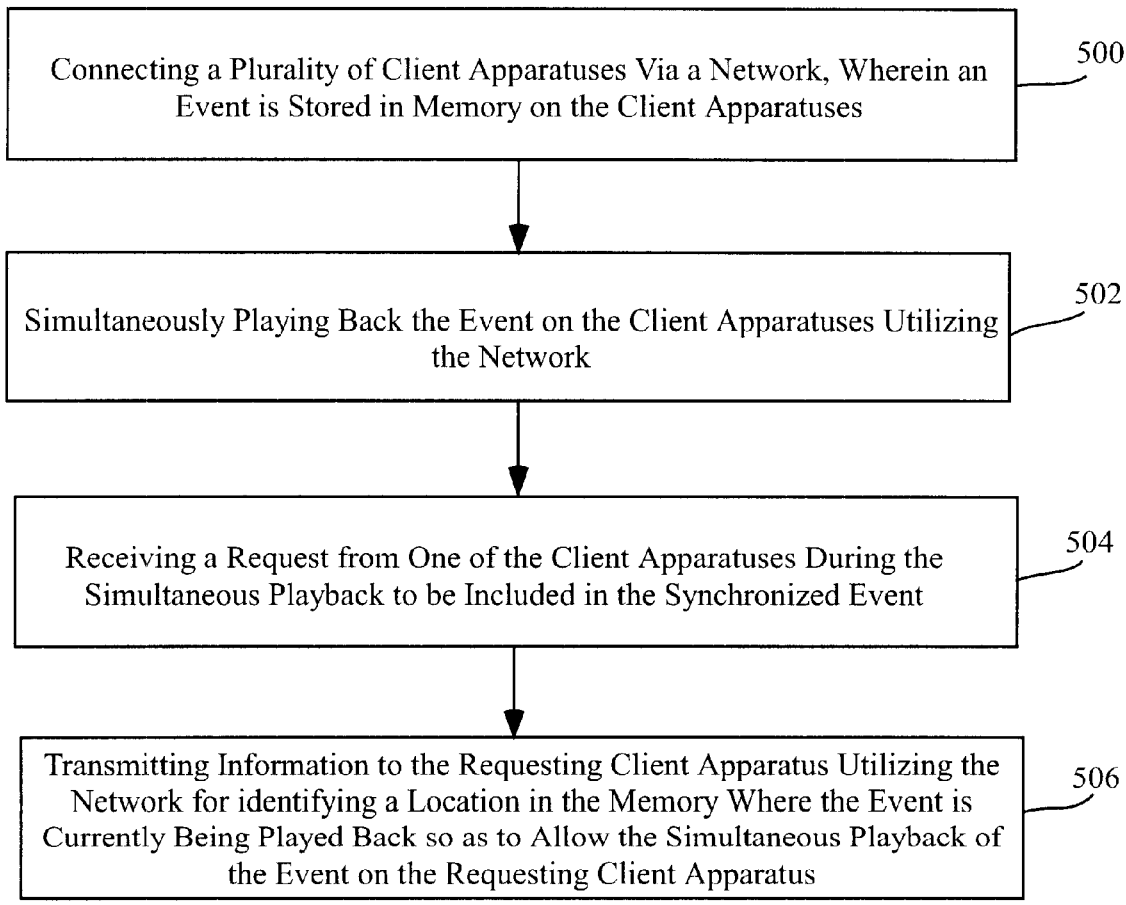
FIG. 5 illustrates a flow diagram for delayed synchronization of an event on a plurality of client apparatuses in accordance with one embodiment of the present invention.

FIG. 5 illustrates a flow diagram for delayed synchronization of an event on a plurality of client apparatuses. First, in operation 500, a plurality of client apparatuses are connected via a network and an event is stored in memory on the client apparatuses. The event is then simultaneously played back on the client apparatuses utilizing the network, as set forth earlier. Note operation 502.

During the simultaneous playback, a request may be received from one of the client apparatuses for that particular to be included in the synchronized event, as set forth in operation 504. This request may be received after the synchronized event has already begun while it is still playing. Further, the request may be submitted via a site on a network, i.e. website.

In response to the request, information is transmitted in operation 506 to the requesting client apparatus utilizing the network. This information is adapted for identifying a location in the memory where the event is currently being played back. This allows the simultaneous playback of the event on the requesting client apparatus.

The end users are thus able to come in at a later time and to be synchronized with the event. Targeted synchronization and various filters criteria can be applied to target different audiences. Also language and cultural differences can be taken into account. Still yet, the present invention may be adapted to address users on different hardware platforms (MAC, PC, set-top boxes). This may be accomplished by identifying the user using a cookie, a user profile which is identified by way of a log in, or a Burn Cut Area (BCA) of the disc.

An example setting forth details relating to identifying DVDs will now be set forth. First, a content owner (such as studio) requests use of the BCA on their DVDs. Based on request, the replicator (examples include WAMO, Panasonic, Nimbus, Technicolor, Pioneer, Crest) adds unique BCA number to every DVD. Adding BCA number to each DVD requires a special (YAG) laser. This may be the very last step in the manufacturing process. The BCA numbers for a specific DVD must then be entered into InterActual's BCA database. Information to track includes: DVD title, i.e. "Lost in Space"; BCA #/range, i.e. 12345687890; and Shipping Packaging/Tracking Container, i.e. Box 52221 to Hollywood Video.

After the BCA number is added to the DVDs, the DVDs are packaging/boxed for distribution to either the Distributor or the Retailer. It should be noted that many companies take multiple forms, so the replicator and distributor may be one in the same. Also, some retailers are large/important enough to get shipments directly from replicator. The way in which the DVDs are packaging/shipped is very important because one must track the BCA numbers to actual shipping containers (box, etc.). Therefore tracking information must also be added to the BCA database.

If packaged DVDs are then sent to distributor, the distributor also has mechanisms, i.e. scanners, input device, and monitoring devices, in place for tracking based on their distribution. For example, Deluxe may receive a "package" of 100,000 copies of "Lost in Space." However, the distributor ships 10,000 to Retailer A and 5,000 to Retailer B. The distributor should be able to "input" retailer A and B's distribution information into the system. Ideally, this becomes a seamless/automated process.

Once the DVDs reach the retailer (either from the replicator or distributor), then DVDs may be further divided and distributed to local stores/outlets. In such a situation, the retailer should be able to automatically "track" distribution of these DVDs through to their stores. Over time, all three entitities (replicator, distributor, and retailer) are able to add tracking information to BCA database. Due to complexity and dependencies on existing business systems, the retail tracking concept will be rolled out in phases: replicator first most likely with key retail accounts. The distributors will be brought in. Retailers will then begin to embrace the ability to track based on local outlet/store.

By the foregoing design, easy deployment is thus afforded and minimal hardware is required to allow the synchronization of content without significant capital investments and with a very efficient control mechanism. The content delivery does not rely on high network bandwidth and is independent from the synchronization.

Internet Server Application Program Interface (ISAPI) extensions will be used on the server. ISAPI extensions provide a mechanism to maintain a temporary or permanent connection with the users. These connections allow the Synchronization Server to process request and to send the appropriate DVD commands. The permanent connections are known as "Keep Alive" connections. ISAPI extension can also be used as an HTTP interface to a more traditional server, with all data returned as text.

On the client side the approach is to use, but not limited to Java 1.1 applets, to initiate event start-up for the Synchronization server. The advantage of using Java 1.1 applets is to achieve platform independence for existing and future Java-enabled devices. JavaScript will be used to provide user interface navigation by "wrapping" the applet.

An ISAPI (Internet Server Application Program Interface) is a set of Windows program calls that let one write a Web server application that will run faster than a Common Gateway Interface (CGI) application. A disadvantage of a CGI application (or "executable file," as it is sometimes called) is that each time it is run, it runs as a separate process with its own address space, resulting in extra instructions that have to be performed, especially if many instances of it are running on behalf of users. Using ISAPI, you create a Dynamic Link Library (DLL) application file that can run as part of the Hypertext Transport Protocol (HTTP) application's process and address space. The DLL files are loaded into the computer when HTTP is started and remain there as long as they are needed; they don't have to be located and read into storage as frequently as a CGI application. Existing CGI applications can be converted into ISAPI application DLLs without having to rewrite their logic. However, they do need to be written to be thread-safe so that a single instance of the DLL can serve multiple users. A special kind of ISAPI DLL is called an ISAPI filter, which can be designated to receive control for every HTTP request. One can create an ISAPI filter for encryption or decryption, for logging, for request screening, or for other purposes.

One can write ISAPI server extension DLLs (ISAs) that can be loaded and called by the HTTP server. Users can fill out forms and click a submit button to send data to a Web server and invoke an ISA, which can process the information to provide custom content or store it in a database. Web server extensions can use information in a database to build Web pages dynamically, and then send them to the client computers to be displayed. An application can add other custom functionality and provide data to the client using HTTP and HTML.

One can write an ISAPI filter. The filter is also a DLL that runs on an ISAPI-enabled HTTP server. The filter registers for notification of events such as logging on or URL mapping. When the selected events occur, the filter is called, and one can monitor and change the data (on its way from the server to the client or vice versa). ISAPI filters can be used to provide custom encryption or compression schemes, or additional authentication methods.

Both server extensions and filters run in the process space of the Web server, providing an efficient way to extend the server's capabilities.

Overall Component Design

The various functional components of the software associated with the present invention will now be set forth. Such components include a Java/JavaScript Component, Synchronizer Component, LayerImpl Component, Business Layer Component, Configuration Manager Component, and DBConnect Component.

Java/JavaScript Component

Figure 6:
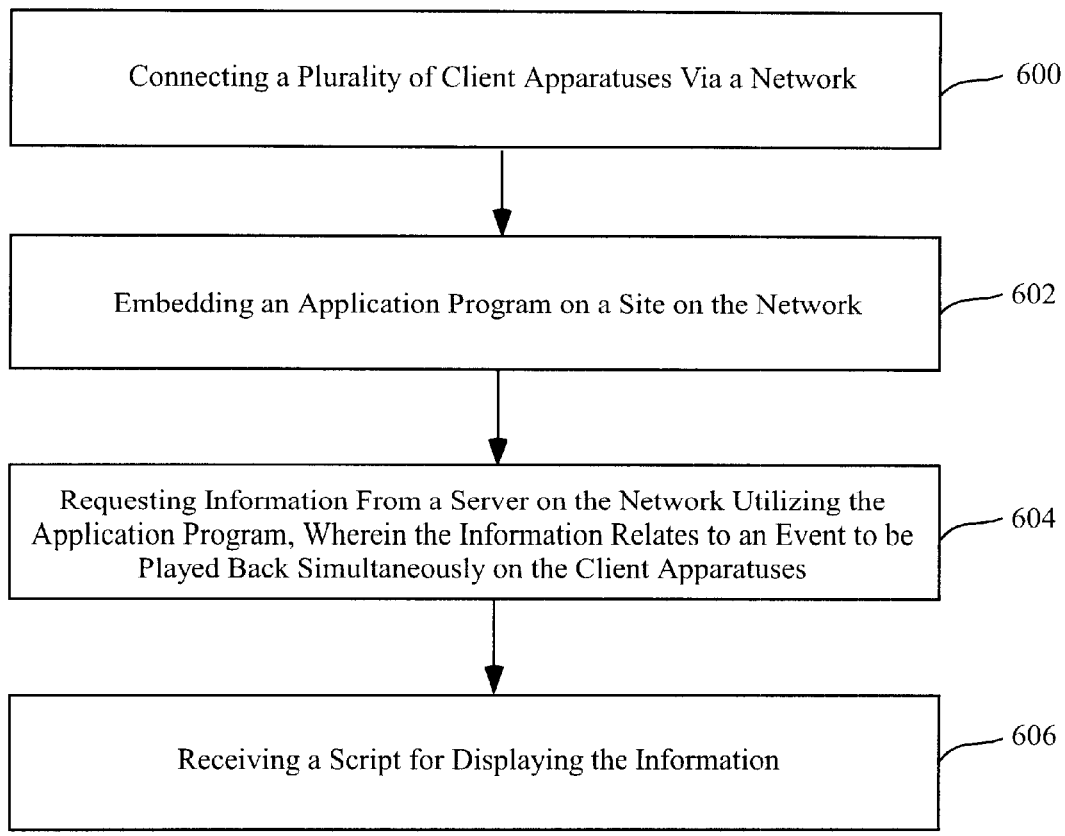
FIG. 6 illustrates a flow diagram for providing information on a synchronized event on a plurality of client apparatuses in accordance with one embodiment of the present invention.

FIG. 6 illustrates a flow diagram for providing information on a synchronized event on a plurality of client apparatuses in accordance with one embodiment of the present invention. First, in operation 600, a plurality of client apparatuses are connected via a network, as set forth earlier. Next, an application program is embedded on a site on the network in operation 602. Such application program may take the form of a JAVA applet, and the site may include a website on the Internet.

In use, information is requested from a server on the network utilizing the application program. See operation 604. Such information relates to an event to be played back simultaneously on the client apparatuses and may include general information such as a start and stop time of the event, or more specific information about the event itself.

In response to such request, a script is received for displaying the information. Note operation 606. The script may take any form such as Perl, REXX (on IBM mainframes), and Tcl/Tk, and preferably includes a JAVAscript.

In one embodiment of the present invention, the JAVA applet may be further adapted to send a request to retrieve command information from the server for use with a playback device of one of the client apparatuses. The commands may be adapted to playback the event on the playback device simultaneous with the playback of the event on the remaining client apparatuses. Further, the commands may include a start time when the playback of the event is to begin on each of the client apparatuses.

The JAVA applets and JAVAscript are used to communicate with the playback device of the client apparatuses. In one embodiment, the playback device includes a PCFriendly TM video player manufactured by Interactual®.

The Java applet is embedded within a web page and uses HTTP protocol to communicate to the synchronization server. The applet could request event information from the server, and display it to the user via JavaScript. The applet could also send a "BroadcastVideoEvent" request to retrieve DVD commands that can be passed to the video component, as set forth hereinabove.

Synchronizer Component

Figure 7:
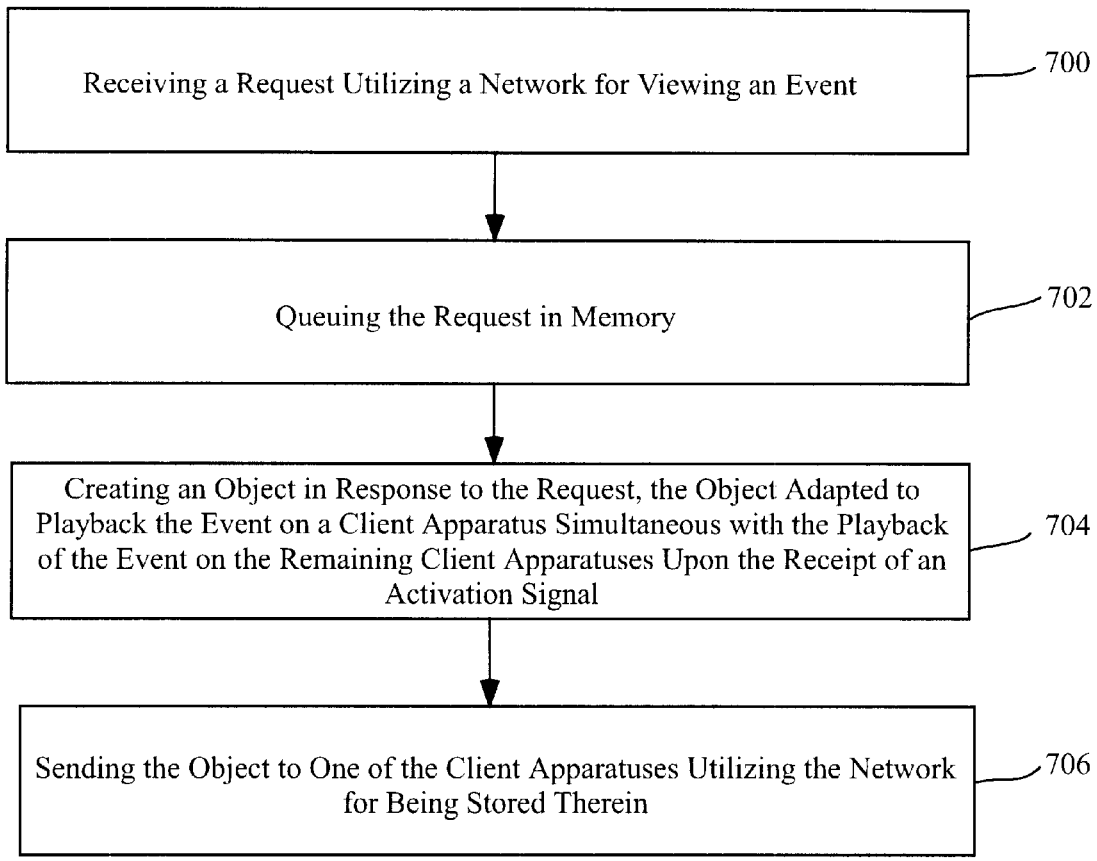
FIG. 7 illustrates a method for creating a synchronizer object in order to playback an event simultaneously on a plurality of client apparatuses in accordance with one embodiment of the present invention.

FIG. 7 illustrates a method for creating a synchronizer object in order to playback an event simultaneously on a plurality of client apparatuses. The synchronizer object is portion of the software that actually implements the synchronization procedure. First, in operation 700, a request is received utilizing a network for viewing an event. Next, the request is queued in memory in operation 702.

In response to the request, in operation 704, an object is created which is adapted to playback the event on a client apparatus simultaneous with the playback of the event on the remaining client apparatuses upon the receipt of an activation signal. As an option, the activation signal may be provided using a clock of the client apparatus, or located at a different location, i.e. server. To accomplish this, the object identifies a start time when the playback of the event is to begin on each of the client apparatuses.

In operation 706, the object is sent to one of the client apparatuses utilizing the network for being stored therein. In accordance with a primary aspect of the present invention, the object may be adapted to playback the event which is stored in memory of the client apparatus. This may be accomplished by activating a digital video disc (DVD) player.

In summary, when the Synchronizer component receives a "Broadcast VideoEvent" from the applet, it then places the request in the thread queue for processing. To process a request, the thread creates a "call back" object, if one does not exist for this event. The thread then adds the request to the "call back" object queue. This "call back" object will be invoked when it is time to play the DVD. The Synchronizer component creates a Call Back COM object, LayerSink. The Synchronizer component is also responsible for creating the LayerFactory interface which will be set forth hereinafter in greater detail.

LayerImpl Component

Figure 8:
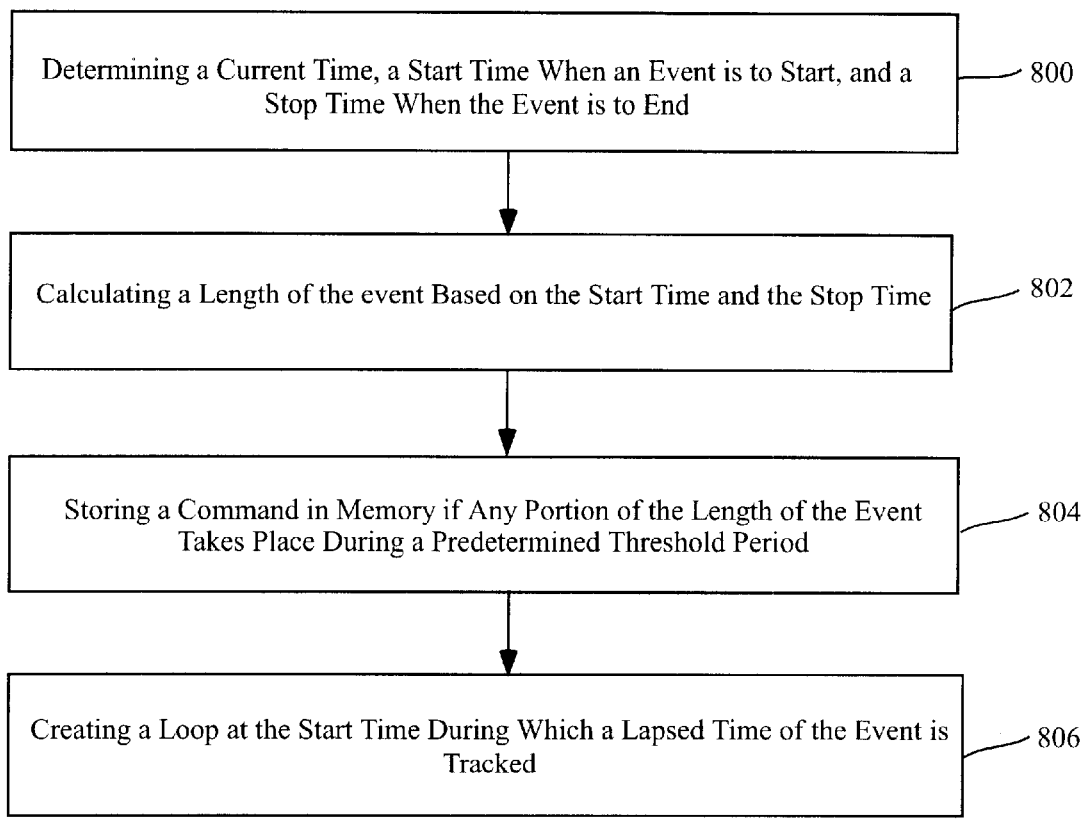
FIG. 8 illustrates a flowchart for affording a scheduler object adapted to facilitate the playback of an event simultaneously on a plurality of networked client apparatuses in accordance with one embodiment of the present invention.

FIG. 8 illustrates a flowchart for affording a scheduler object adapted to facilitate the playback of an event simultaneously on a plurality of networked client apparatuses. The present method ensures that critical information is tracked during the synchronization of the event. Such critical information not only ensures proper synchronization, but also enables various peripheral features.

First, in operation 800, various values are determined including a current time, a start time when an event is to start, and a stop time when the event is to end. Thereafter, a length of the event is calculated based on the start time and the stop time in operation 802. As an option, the current time is determined by querying a clock of one of the client apparatuses.

If any portion of the length of the event takes place during a predetermined threshold period, a command is stored in memory in operation 804. The command may be adapted to automatically begin playing back the event at the start time. In one embodiment, the threshold period includes the time the users can be queued before the event. As an option, chapter information may be stored in the memory if any portion of the length of the event takes place during the predetermined threshold period. This allows the command to automatically begin playing back the event at a predetermined chapter.

In operation 806, a loop is created at the start time during which a lapsed time of the event is tracked. This information may be used for various tracking purposes to decide when to issue commands to the user. In another embodiment, a second loop may be created upon the beginning of a chapter during which information on a next chapter is retrieved.

The "call back" object (LayerSink) is thus responsible for creating and communicating with the LayerImpl component. The LayerImpl component acts as a scheduler, determining when to issue commands to the user.

LayerImpl will issue different DVD commands, based on the type of decoder the user has in their PC. LayerImpl will differentiate between the decoders by using the decoder information submitted from the client. The LayerImpl will pass the correct DVD command to the client, based on the decoder's capabilities. For example, if the decoder does not support the TimePlay event, then the server may send a ChapterPlay event and wait appropriately.

The following is an enumerated summary of the steps the component uses to determine when the users will receive the DVD commands:

1. Retrieves the current time, and the time the event starts and ends.
2. Calculates the length of the event.
3. If the event is within a threshold period (i.e. the time users can be queued before the event), then store the first DVD command in memory. Also, store the Chapter information in memory.
4. Create a loop that processes request until the event has completed.
5. In the loop, calculate the lapsed time of the event.
6. In the loop, retrieve the next chapter information.
7. Create another loop that will loop until time for the next chapter to be played.
8. When the next chapter is ready to play, send the command that was retrieved from the Chapter table.

Business Layer Component

Figure 9:
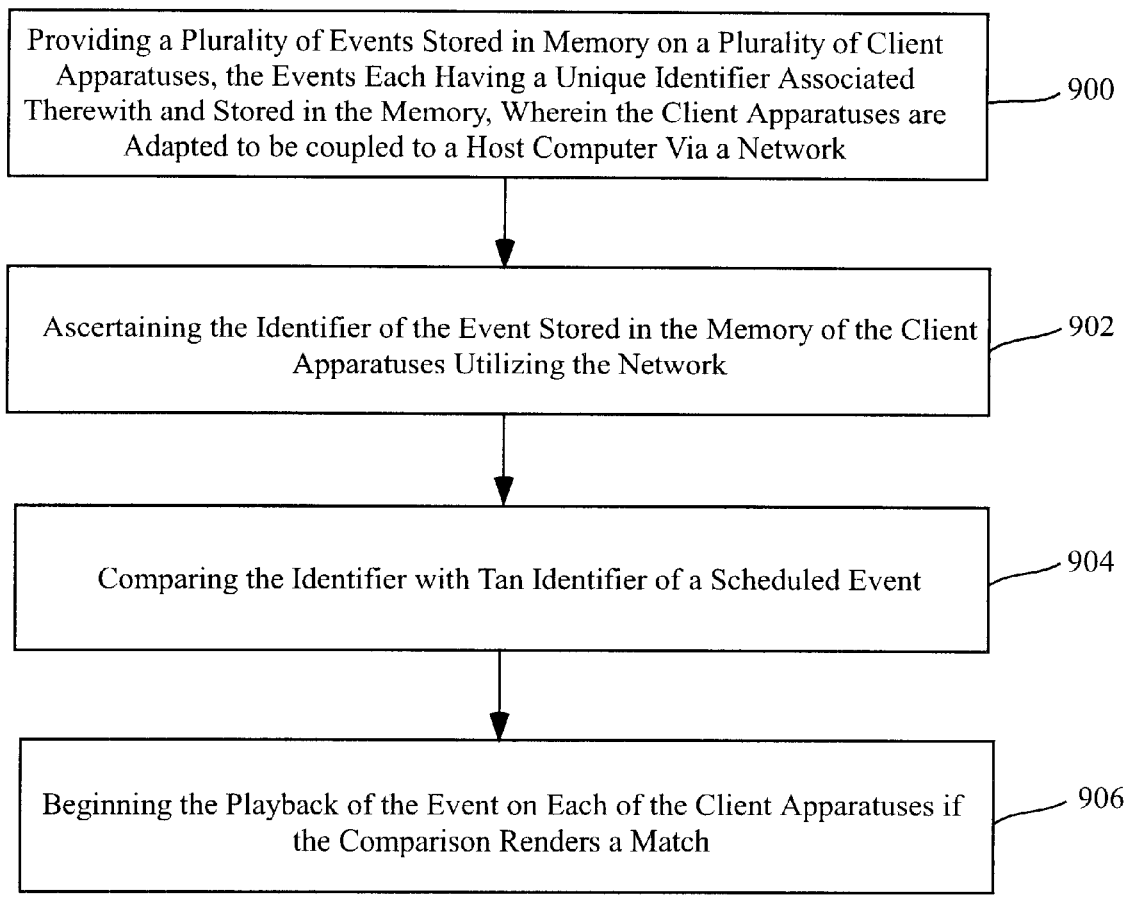
FIG. 9 is a flowchart delineating a method for identifying a plurality of events which are played back simultaneously on a plurality of networked client apparatuses in accordance with one embodiment of the present invention.

FIG. 9 is a flowchart delineating a method for identifying a plurality of events which are played back simultaneously on a plurality of networked client apparatuses. This features is important since a host server may be synchronizing more than one event at once, or during overlapping times. Such events must therefore be distinguished.

First, in operation 900, a plurality of events are stored in memory on a plurality of client apparatuses. Each of the events is assigned a unique identifier which is stored in the memory.

In operation 902, the client apparatuses are adapted to be coupled to a host computer via a network, as set forth hereinabove. In operation 904, the identifier of the event which is stored in the memory of the client apparatuses is then retrieved utilizing the network. Such identifier is subsequently compared with an identifier of a scheduled event, as set forth in operation 906. If the comparison renders a match, the playback of the event is begun on the appropriate client apparatuses. Note operation 908.

CbusinessLayer thus differentiates events by the disk and location ids, uploaded by the client to guarantee backwards compatibility. As set forth earlier, late arrivals can always re-sync with the event.

Configuration Manager Component

Figure 10:
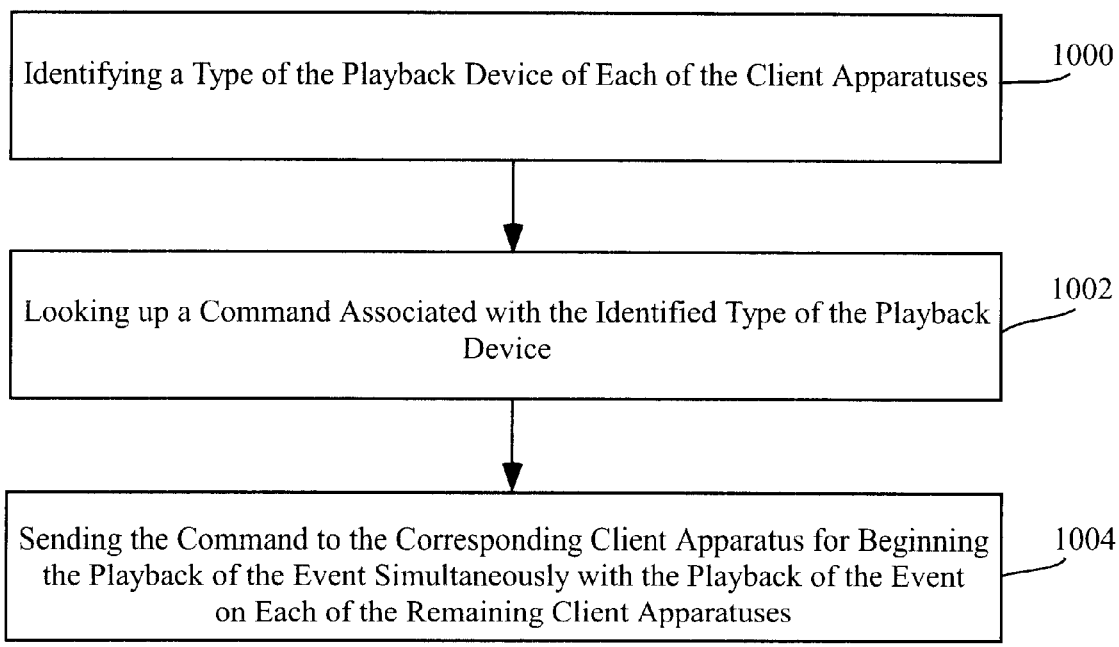
FIG. 10 shows a flowchart delineating a technique for interfacing a plurality of different types of playback devices of client apparatuses which are networked to simultaneously playback an event in accordance with one embodiment of the present invention.

FIG. 10 shows a flowchart delineating a technique for identifying playback devices of a plurality of client apparatuses which are networked to simultaneously playback an event. The present technique is important since the playback devices of the various client apparatuses may differ in make and model. Thus, different commands are required therefor.

In operation 1000, a type of the playback devices of the client apparatuses is first identified. Such "type" may refer to a make, model, or any other distinguishing characteristic of the particular playback devices. A command associated with the identified type of the playback device is then looked up in a look-up table. Note operation 1002. Such table may be located at the host server, or at any other location such as the client apparatuses.

Thereafter, in operation 1004, the command is sent to the corresponding client apparatus for beginning the playback of the event simultaneously with the playback of the event on each of the remaining client apparatuses.

This component is thus responsible for identifying what type of reference player is hosting the event. The reference player can be the database, which contains the DVD commands or a real time player. When the initial DVD is command is requested, the "Synchronizer" table is queried for the host type. From that point forward, the scheduler would know from whom to receive data.

DBConnect Component

This component is responsible for communicating with the Synchronizer tables, and for providing access methods for the retrieved data. All interaction from the tables is on a read-only basis. The LayerImpl component communicates with this component to retrieve DVD commands and event information.

Even though current implementation may be based on a Microsoft platform, hard dependencies on Microsoft or any other 3rd-party development tools may be avoided. To address such issues, the following considerations may be made throughout the code:

MFC specific code may be avoided. Instead, STL may be used. ATL and/or MFC code may be encapsulated into separate classes and portioned from the rest of the code.

Class implementations may use aggregation pattern to delegate business logic to the portable classes. Database connection classes may be separated and the communication protocol may be separated with respect to portability to Oracle and other platforms.

Figure 11:
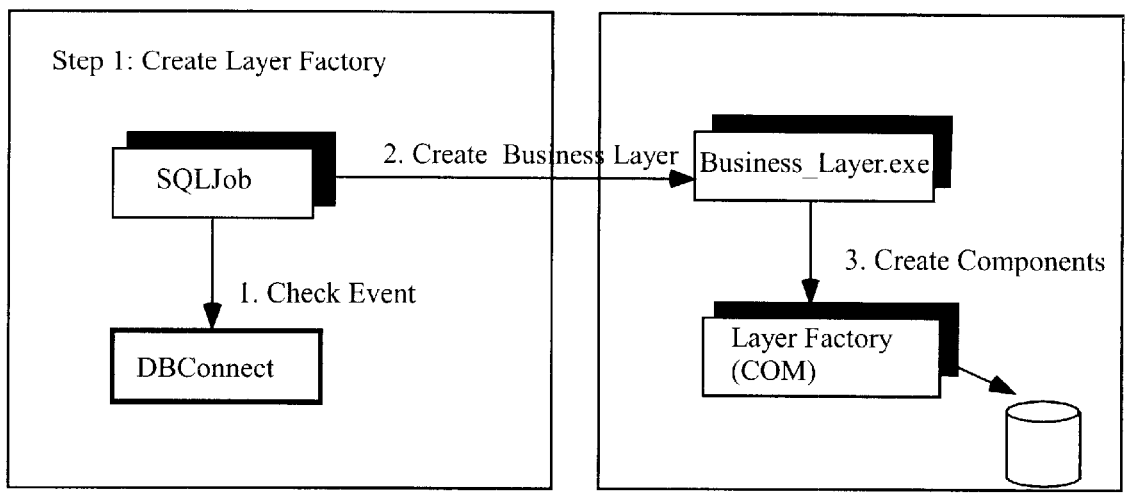
FIG. 11 illustrates the manner in which a layer factory is created in accordance with one embodiment of the present invention.
Figure 12:
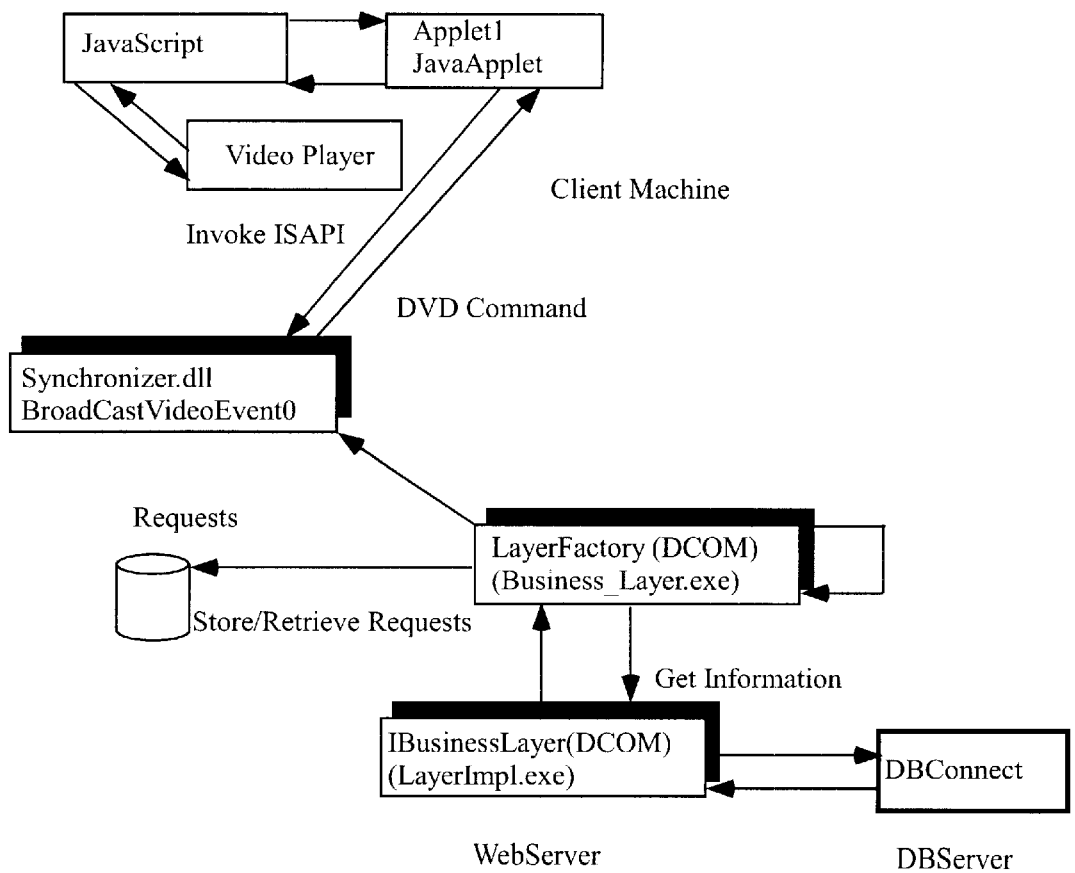
FIG. 12 illustrates the manner in which user requests are processed in accordance with one embodiment of the present invention.
Figure 13:
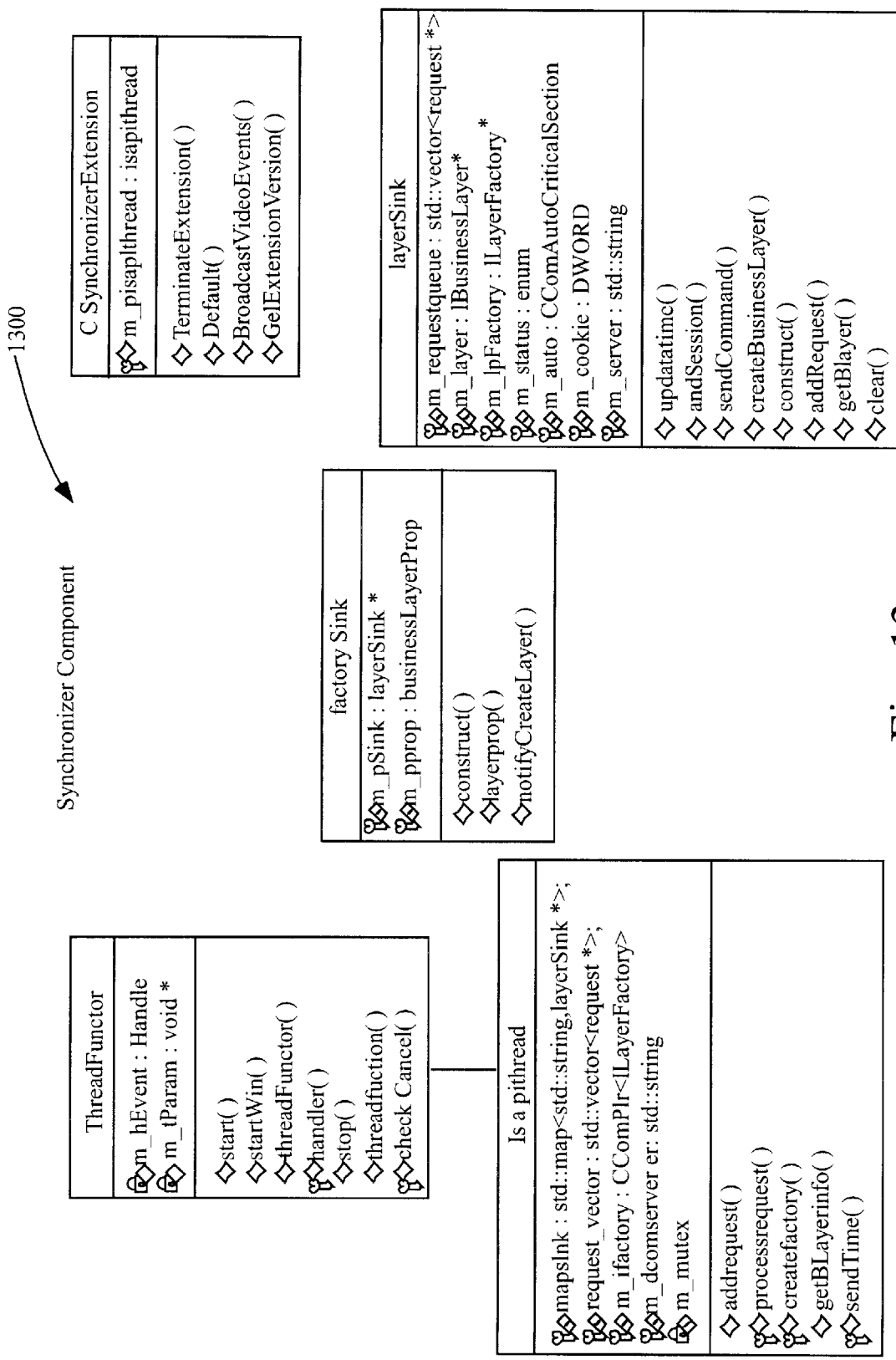
FIGS. 13–16 illustrate various class/component diagrams in accordance with one embodiment of the present invention.
Figure 14:
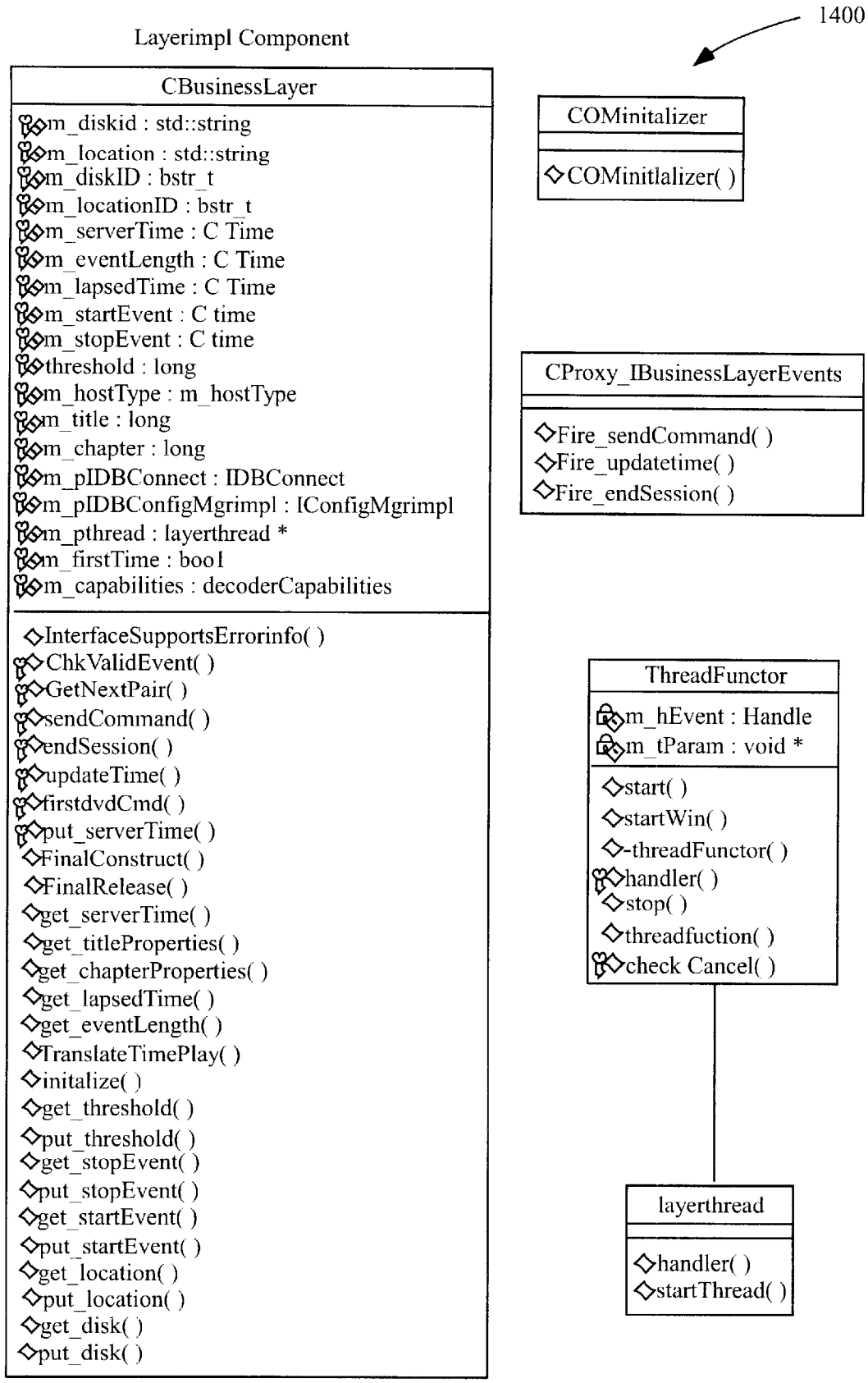
Figure 15:
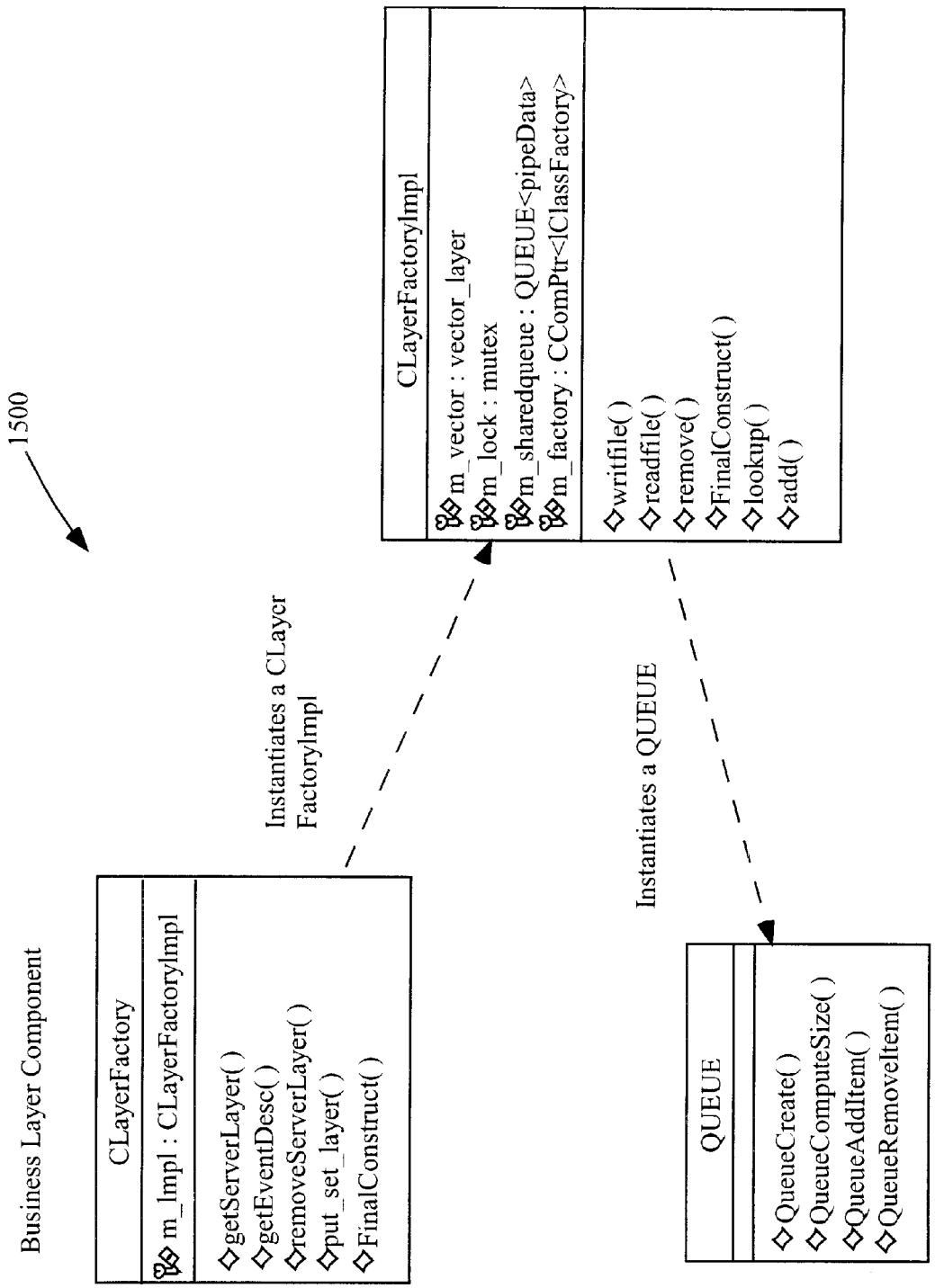
Figure 16:
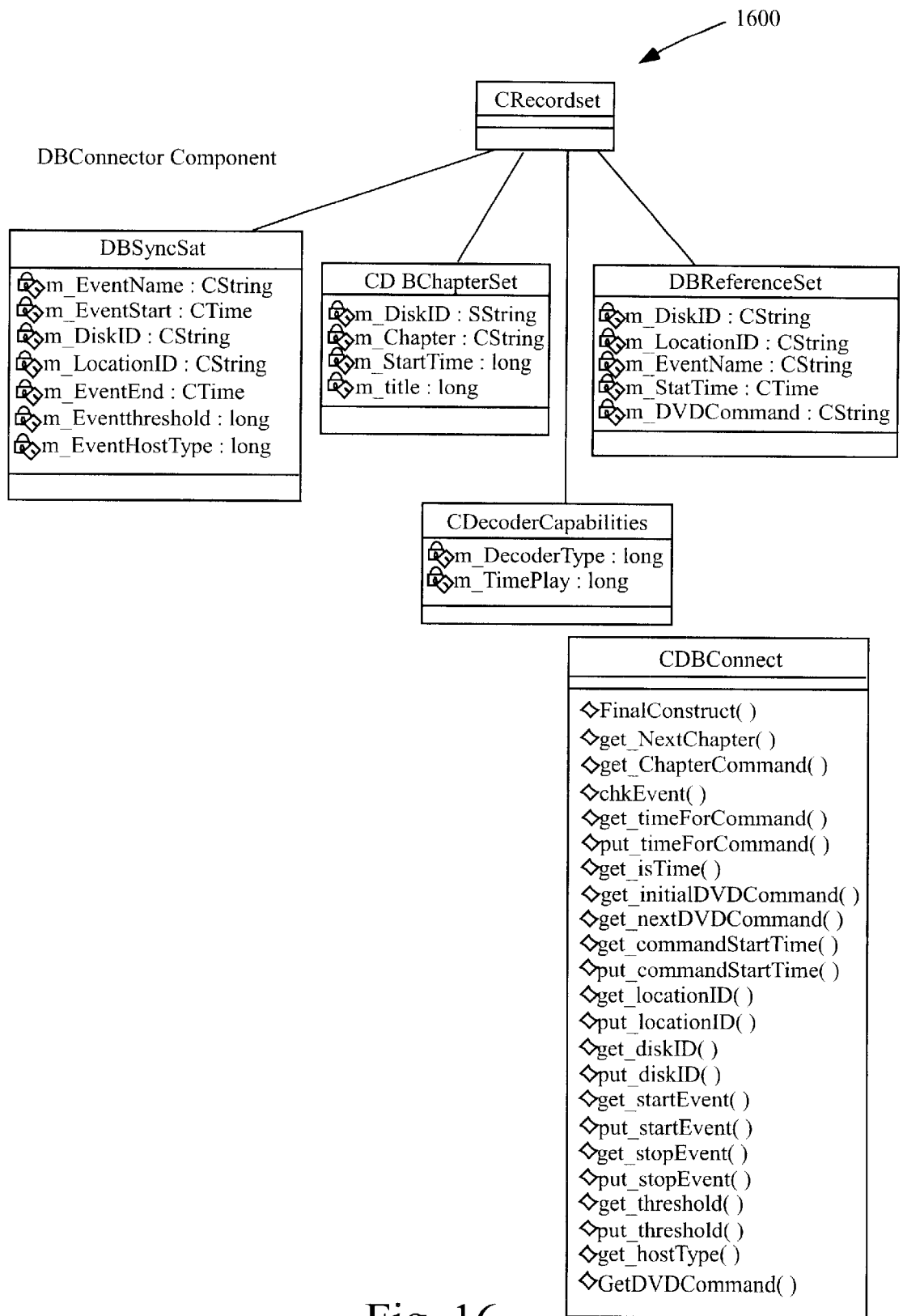

FIGS. 11 and 12 illustrate the order of events among the various components of the present invention. In particular, FIG. 11 illustrates the manner in which a layer factory is created. As shown, an event is first checked in a database server after which a business layer is created in a WEB server in a manner set forth hereinabove. The foregoing components are then created. FIG. 12 illustrates the manner in which user requests are processed. As shown, communication is afforded with the video player on the client machine by means of JAVAscript and JAVA applets. The WEB server, in turn, communicates DVD commands to the video player via the JAVA applets, and also interfaces the database server via the various components thereof which were set forth hereinabove.

Alternate Embodiments

To support future enhancements, further components may be included with extendibility as the major objective. Various future enhancements of the product and how they will be addressed will now be set forth.

Hosted Real Time Players

While spirals may retrieve pre-recorded DVD commands from the database, alternate spirals may support a consumer as a host. The architecture may also support plug-in components. Alternate spirals may support the RealTimeConnector component, which accepts host user request and forwards them to the clients. The instant architecture supports the DBConnector which accepts events from the database.

Keep Alive Connections

Clients may maintain connections throughout the event. This allows the host to send a various number of commands to the client of the event. Although the spiral disconnects users once a PLAY command has been issued, the Synchronizer class (which will be set forth later) adds each connection to a Thread Pool. This pool of connections can be left open during the life of the event.

Logging Participants

Each request may be logged into the database to provide a reference for the future.

DVD Positioning

As an option, connections may be pooled to allow the synchronization server to direct consumer's machines to the certain locations throughout the entire event.

Synchronization events in alternate spirals may be defined as a combination of play from location event and the actual event. This way, one describes each event in the unambiguous way on the client side and synchronizes it with the server. For example, a situation may be considered where one fast forwards after a movie is played for 15 min and thereafter plays the scene in the movie. In such situation, one has to submit the information to the client player, indicating that it (player) has to start time play from 15 min into the movie and fast-forward to the certain location. A better way would be to analyze what is the next event after fast forwarding occurred and perform a combination for the play from location and next event. This design would require significant changes to the client infrastructure, including video object, remoteagent and provider and should be taken into consideration in any alternate client design.

Classes/Component Diagrams

FIGS. 13–16 illustrate various class/component diagrams. In particular, FIGS. 13–16 illustrate a Synchronizer Class Diagram 1300, LayerImpl Class Diagram 1400, Business Layer Class Diagram 1500, and DBConnect Class Diagram 1600, respectively.

Sequence Diagrams

Figure 17:
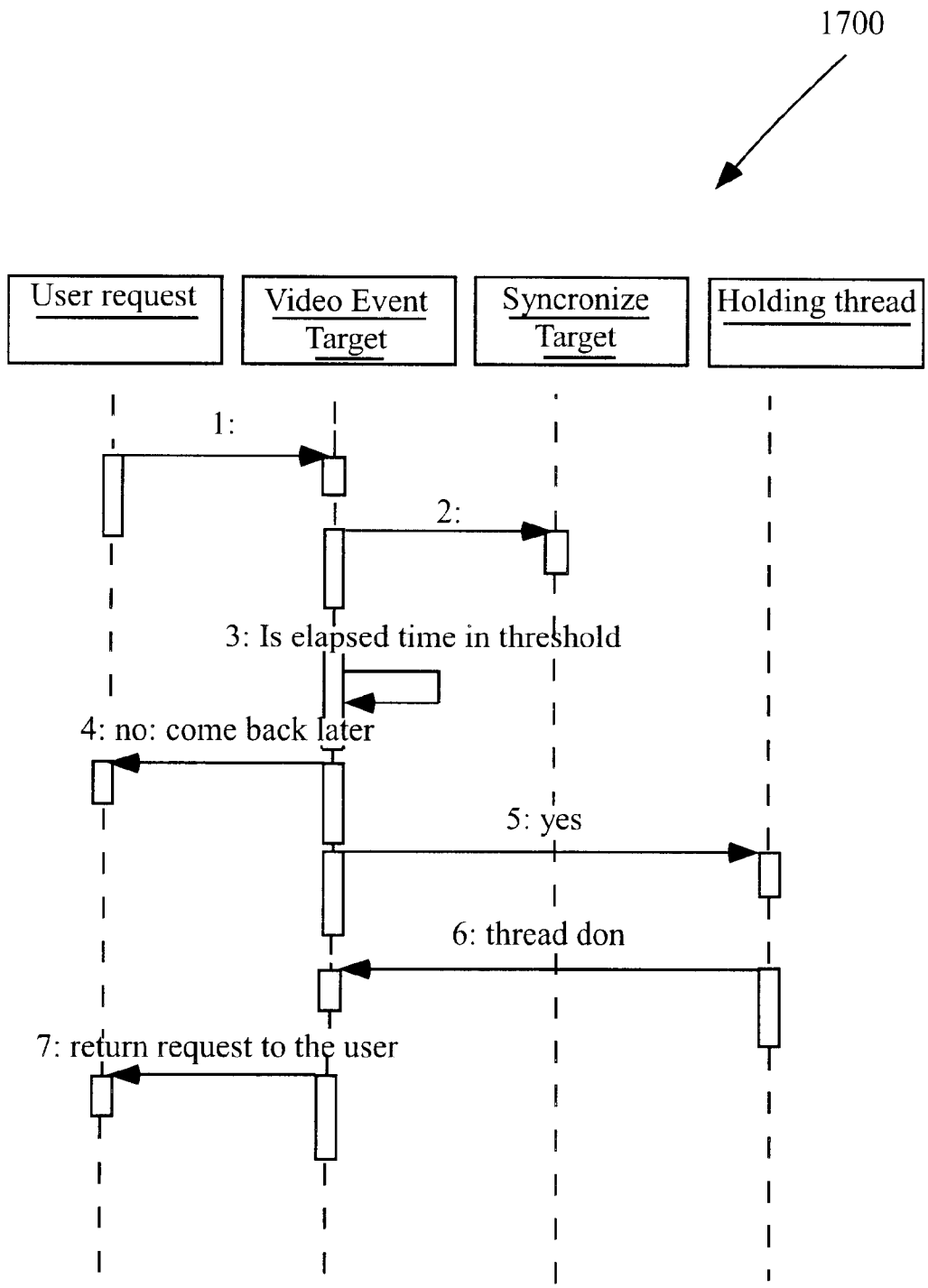
FIG. 17 illustrates a logical sequence diagram in accordance with one embodiment of the present invention.

FIG. 17 illustrates a logical sequence diagram 1700. As shown, when the server receives a user request, it analyzes the authentication information of the request (date/time, disc id, user id, and BCA number) and the appropriate synchronization event stored in the database. The database contains an event start threshold value measured in milliseconds. This threshold defines the amount of time prior to an event that a consumer is eligible to "connect" for the start of the event.

If the date/time of the user request lies within the event start threshold, the user is put into wait queue and receive the appropriate data when the time elapses. Note steps 1,2,3,5, 6,7 of the Logical Sequence diagram. Otherwise, a message is sent informing the user when the event will occur. Note step 4 of the Logical Sequence diagram.

Server Side Collaboration Diagram

Figure 18:
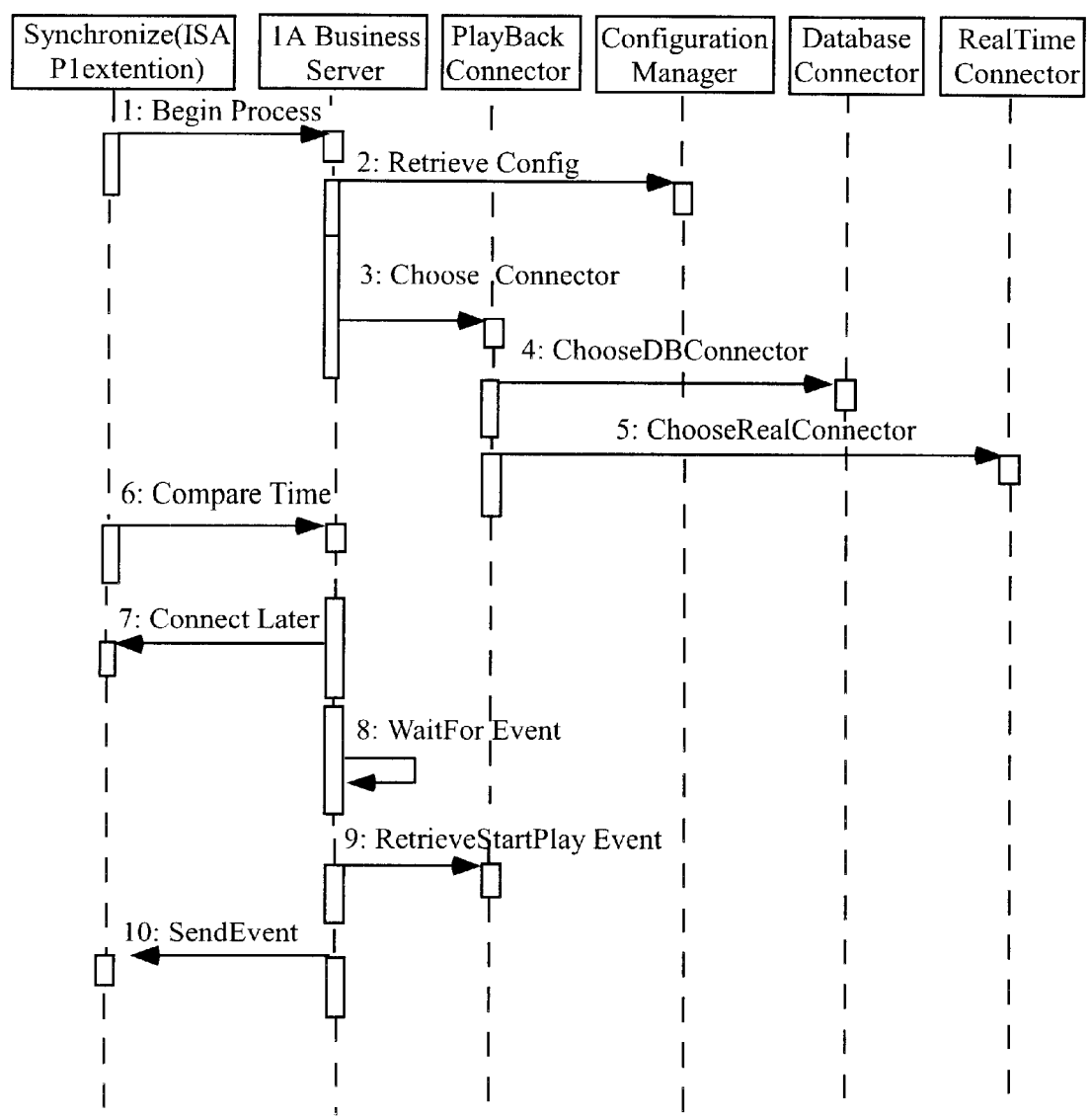
FIG. 18 illustrates a logical sequence diagram that shows server side collaboration in accordance with one embodiment of the present invention.

FIG. 18 illustrates a logical sequence diagram 1800 that shows server side collaboration. As shown, server ISAPI extension receives a BroadcastVideoEvents request. It calls IA_BusinessServer via BeginProcess, to retrieve configuration information. Configuration information contains a playback connector. Playback connector identifies whether the server will have to communicate with a reference player or will it perform playback from the database.

At step 6, ISAPI extension will call IA_BusinessServer CompareTime method and based on the results will send to the user a predefined web page indicating to retry later or return control to the web server, notifying it (web server) to keep the connection open. At this point connection is pooled and will be processed by the IA_BusinessServer at a time of the event.

Client Collaboration Diagram

Figure 19:
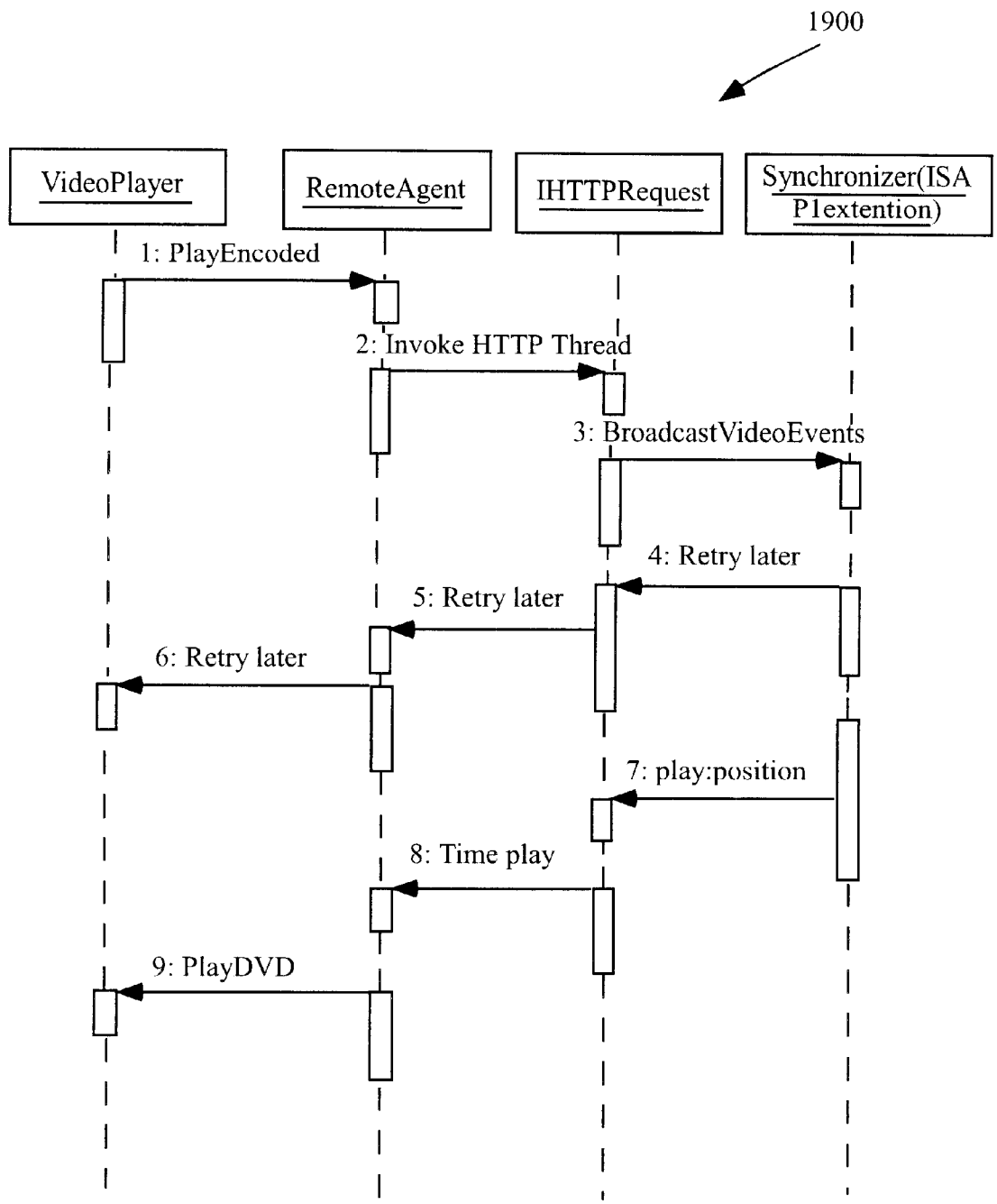
FIG. 19 illustrates a logical sequence diagram showing client side collaboration in accordance with one embodiment of the present invention.

FIG. 19 illustrates a logical sequence diagram 1900 showing client side collaboration in accordance with one embodiment of the present invention.

Classes/Interfaces Definition

Definitions of one embodiment of the various classes associated with the software which implements the present invention will now be set forth.

Class Applet1

Purpose:

This is the class that implements the applet. The browser will use it to bootstrap our applet.

Responsibilities:

Request a BroadCastVideo event and to gather event status information.

Collaborations:

BroadCastEvent, CITIEncrypt

Base class and implemented interfaces:

Javax.Applet

Public interface:

getChapter Returns the current chapter the reference player is playing.

Return type: String

Parameters: void

Pre-conditions: None.

Post-conditions: None.

getTitleinfo Returns the current title the reference player is playing

Return type: String

Parameters: void

Pre-conditions: None.

Post-conditions: None.

getStartTime Returns the time the event is scheduled to start <SS MM:HH:DD:MM:YYYY>
Return type: String
Parameters: void
Pre-conditions: None.
Post-conditions: None.
getStartTimeSec Returns the time the event starts in seconds.
Return type: String
Parameters: void
Pre-conditions: None.
Post-conditions: None.
getStartTimeMinReturns the time the event starts in minutes.
Return type: String
Parameters: void
Pre-conditions: None.
Post-conditions: None.
getStartTimeHrReturns the time the event starts in Hours.
Return type: String
Parameters: void
Pre-conditions: None.
Post-conditions: None.
GetStartTimeDay Returns the time the event starts in days.
Return type: String
Parameters: void
Pre-conditions: None.
Post-conditions: None.
GetStartTimeMnth Returns the time the event starts in months.
Return type: String
Parameters: void
Pre-conditions: None.
Post-conditions: None.
GetStartTimeYr Returns the time the event starts in year.
Return type: String
Parameters: void
Pre-conditions: None.
Post-conditions: None.
GetLenOfEvent Returns the length of the event.
Return type: String
Parameters: void
Pre-conditions: None.
Post-conditions: None.
GetExpiredTime: Returns lapse time of the event.
Return type: String
Parameters: void
Pre-conditions: None.
Post-conditions: None.
getServerTime: Returns the servers current time <SS:MM:HH:DD:MM:YYYY>.
Return type: String
Parameters: void
Pre-conditions: None.
Post-conditions: None.
getServerTimeSec: Returns the servers current in seconds.
Return type: String
Parameters: void
Pre-conditions: None.
Post-conditions: None.
getServerTimeMin: Returns the servers current in minutes.
Return type: String
Parameters: void
Pre-conditions: None.
Post-conditions: None.
getServerTimeHr: Returns the servers current in hours.
Return type: String
Parameters: void
Pre-conditions: None.
Post-conditions: None.
getServerTimeDay: Returns the servers current in day.
Return type: String
Parameters: void
Pre-conditions: None.
Post-conditions: None.
getServerTimeMnth: Returns the servers current in month.
Return type: String
Parameters: void
Pre-conditions: None.
Post-conditions: None.
getServerTimeYr: Returns the servers current in year.
Return type: String
Parameters: void
Pre-conditions: None.
Post-conditions: None.
startProc: Calls the ISAPIs "Serverinfo" method.
Return type: void
Parameters: String disk id, String location id
Pre-conditions: None.
Post-conditions: None.
msgEvent: Calls BroadCastEvent applet.
Return type: void
Parameters: void
Pre-conditions: None.
Post-conditions: None.
Class BroadCastEvent
Purpose:
This is the class that invokes the Synchronizer.
Responsibilities:
Sets the JavaScript with the command returned from the server.
Collaborations:
CITIEncrypt
Base class and implemented interfaces:
Java.Thread
Class CDBConnect
Purpose:
This is the class provides a public interface for components to request information from the DB tables.
Responsibilities:
Opens the database and Synchronizer, Chapter_Disk tables.

Queries the Synchronizer by the specified disk id and location id.

Queries the Chapter_Disk by disk id.

Provides the next chapter that is scheduled to play.

Queries the Decoder_Capabilities table to determine if the requested player is time or chapter play.

Collaborations:

DBSyncSet

DBReferenceSet

CDBChapterSet

CDecoderCapabilities

Base class and implemented interfaces:

Public interface:

Get_NextChapter: Returns the next chapter to play.

Return type: String

Parameters: long time, long title, BSTR Chapter

Pre-conditions: None.

Post-conditions: None.

chkevent: Checks if an event is scheduled for the disk and location id.

Return type: String

Parameters: long time, long title, BSTR Chapter

Pre-conditions: None.

Post-conditions: None.

get_initialDVDCommand: Returns the first DVD command to play.

Return type: String

Parameters: BSTR &

Pre-conditions: None.

Post-conditions: None.

get_nextDVDCommand: Returns the next DVD command to play.

Return type: String

Parameters: BSTR&

Pre-conditions: None.

Post-conditions: None.

decoderarray: Returns an array of decoder types.

Return type: String

Parameters: long , long

Pre-conditions: None.

Post-conditions: None.

Class CCConfigMgrImpl

Purpose:

This is the class provides a public interface for components to determine the type of reference player hosting the event.

Responsibilities:

Opens the database and Synchronizer, Chapter_Disk tables.

Queries the Synchronizer by the specified disk id and location id.

Stores the reference player type.

Collaborations:

CConfigMgrRecSet

Base Class and Implemented Interfaces:

Public interface:

get_hostType: Returns the reference player host type.

Return type: String

Parameters: short

Pre-conditions: None.

Post-conditions: None.

Class threadFunctor

Purpose:

This class provides a threading model that classes can use to derive.

Responsibilities:

Calls the CreateEvent function, which opens a named or unnamed event objec.

Calls_beginthread, which creates a thread begins execution of a routine at start_address. The routine at start_address must use the_cdecl calling convention and should have no return value. When the thread returns from that routine, it is terminated automatically.

Calls the WaitForSingleObject function, which checks the current state of the specified object. If the object's state is nonsignaled, the calling thread enters an efficient wait state.

Calls the ResetEvent function, which sets the state of the specified event object to nonsignaled.

The state of an event object remains nonsignaled until it is explicitly set to signaled by the SetEvent or PulseEvent function.

Collaborations:

CConfigMgrRecSet

Base class and implemented interfaces:

Public interface:

start: Starts the thread.

Return type: void

Parameters: void

Pre-conditions: None.

Post-conditions: None.

stop: Stops the thread. Calls CloseHandle for the thread and event.

Return type: void

Parameters: void

Pre-conditions: None.

Post-conditions: None.

Class isapithread

Purpose:

This creates an ISAPI thread.

Responsibilities:

Adds a request to a vector.

Creates the sink object.

Stores the request into sink object.

Sends the time information to JavaScript.

Collaborations:

LayerSink factorySink

Base class and implemented interfaces:

threadFunctor

Public interface:

addrequest: Adds the request to its vector.

Return type: void

Parameters: void

Pre-conditions: None.

Post-conditions: None.

getBLayerInfo: Responsible for getting information about the event.

Return type: void

Parameters: std:string&,std: :string&, ChttpServerContext*

Pre-conditions: None.

Post-conditions: None.

Class factorySink
  Purpose:
  Manages the layerSink and businessLayerProp objects.
  Responsibilities:
  Stores a layerSink object.
  Returns the "businesssLayerProp" <Business Layer Properties>
  Creates the "businessLayerProp" <Business Layer structure>
  Collaborations:
  LayerSink
  businessLayerProp
  Base class and implemented interfaces:
  Public interface:
  construct: Stores a layerSink object.
  Return type: void
  Parameters: void
  Pre-conditions: None.
  Post-conditions: None.
  notifyCreateLayer: Responsible for creating a "businessLayerProp".
  Return type: void
  Parameters: BSTR, BSTR, DATE, DATE, LONG
  Pre-conditions: None.
  Post-conditions: None.
Class layerSink
  Purpose:
  layerSink represents a sink interface and stores a queue of requests. It creates a connection point object. This call back object, allows asynchronously processing.
  Responsibilities:
  Acts as the client sink object.
  Sends the results to the user
  Creates the "BusinessLayer" and makes it a connection point object.
  Closes the users connection.
  Creates a Factory interface by calling "createFactory".
  Creates a connection point for the factory.
  Stores the LayerSink in the FactorySink object.
  Creates a connection point (call back) by calling AtlAdvise, between the connection point container and the client sink object. This allows the client to receive events.
  Calls the connectable objects "getServerLayer". This method fires an event to the clients sink object.
  Create a business layer,
  Store the request in its vector.
  Release the Sink Object (client)
  Calls AtlUnadvise to terminates the ability of the client to receive events.
  Collaborations.
  Base class and implemented interfaces:
  Public interface:
  construct: Creates a connection point.
  Return type: void
  Parameters: void
  Pre-conditions: None.
  Post-conditions: None.
  addRequest: Adds the request to its vector.
  Return type: void
  Parameters: BSTR, BSTR, DATE, DATE, LONG
  Pre-conditions: None.
  Post-conditions: None.
  createBusinessLayer: Creates a business layer. Create the connection point.
  Return type: void
  Parameters: businessLayerProp &
  Pre-conditions: None.
  Post-conditions: None.
  updatetime: This call back function translates the time and sends the command to the user.
  Return type: void
  Parameters: long,long
  Pre-conditions: None.
  Post-conditions: None.
Class CBusinessLayer
  Purpose:
  Creates a layerthread object. This object is responsible for providing access methods, which provide event information.
  Responsibilities:
    The "Synchronizers" createBusinessLayer method creates a class object from the "IBusinessLayer" interface. <The class object is part of the LayerImpl project>
    The BusinesLayers class object <m_ilayer>calls its "Initialize" method. <Note: m_ilayer is the connection point object. It identifies the "Sink Interface".
    It then calls the "Initialize" method of the connection point.
    The "Initialize" method then calls the "ChkValidEvent" method, which then creates a layerthread object.
  Collaborations:
  CBusinessLayer
  layerthread
  Base class and implemented interfaces:
  Public interface:
  Initialize: Calls the "ChkValidEvent" method which kicks of a layer thread.
  Return type: void
  Parameters: void
  Pre-conditions: None.
  Post-conditions: None.
Class layerthread
  Purpose:
  This object acts as a scheduler, processing request from its queue.
  Responsibilities:
  Send DVD commands to the user.
  "Syncs" up late corners to the events.
  Collaborations:
  CBusinessLayer
  CDBConnect
  Base class and implemented interfaces:
  Public interface:
  startThread: Processes requests from the queue
  Return type: void
  Parameters: void
  Pre-conditions: None.
  Post-conditions: None.
Class CLayerFactory
  Purpose:
  This object manages businesslayer objects. Business layer objects communicate with the reference player and notify the user which DVD command to play.

Responsibilities:

Send DVD commands to the user.

"Syncs" up late corners to the events.

This object Implements the IID_LayerFactory interface.

This COM object is the servers Connectable Point object.

This server object supports connections to sink interfaces. These sink interfaces reside on the client side and are equivalent to the "call back" functions in Windows.

Collaborations:

CBusinessLayer

CDBConnect

Base class and implemented interfaces:

Public interface:

getServerLayer: "Fires" an event to create a business layer with the properties retrieved from the pipe object.

Return type: void

Parameters: void

Pre-conditions: None.

Post-conditions: None.

put_set_layer: call the "CLayerFactoryImpl" add( ) method. Supplying the "businesslayer" object.

This will added to shared memory queue and written to a file.

Return type: void

Parameters: void

Pre-conditions: None.

Post-conditions: None.

FinalConstruct: Calls the "CLayerFactoryImp1" FinalConstruct COM class object.

Return type: void

Parameters: void

Pre-conditions: None.

Post-conditions: None.

Remote Control of Local Content

Figure 20:
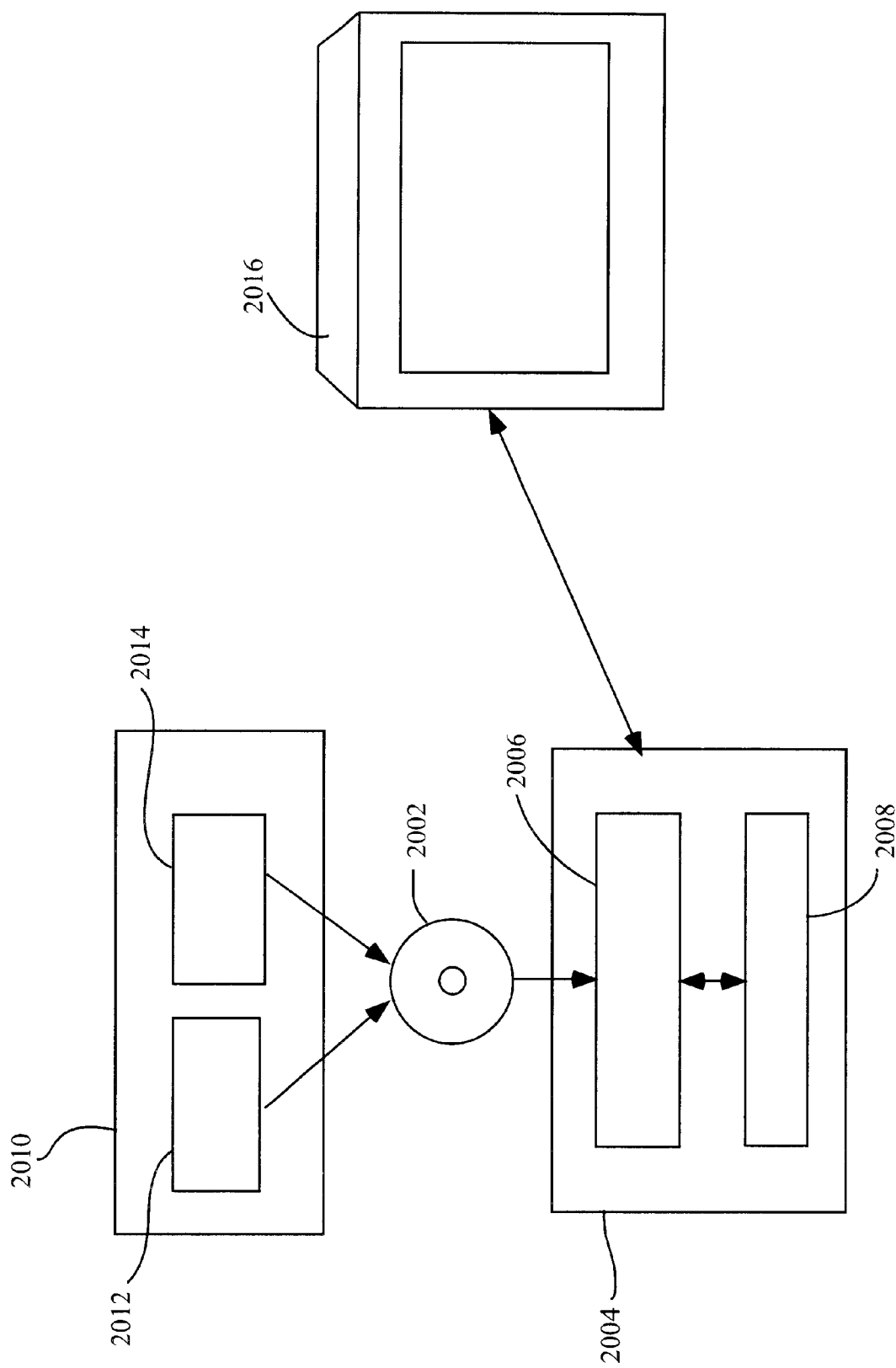
FIG. 20 is a schematic diagram of a process according to an embodiment of the present invention.

With reference to FIG. 20, the present invention provides a system and method for remote control of local content which enables the control of Video Playback from a remote server. Content stored on a medium 2002 such as a DVD is loaded onto a client device 2004. This hardware can be, for example, a computer, set top device such as is used to access WebTV, or some other device. The hardware device 2004 of the present embodiment has software 2006 in the form of a browser or presentation engine. In addition, the hardware 2004 has DVD Firmware or a Navigator 2008 in communication with the browser/presentation software 2006.

With continued reference to FIG. 20, a server 2010 delivers content to the hardware 2004 to be used in conjunction with the DVD 2002. This content can be in the form of ROM/HTML Content 2012 and/or DVD-Video Content 2014. Depending on the desired application, this content 2012 and 2014 enhances and/or allows a DVD experience 2016 provided by the DVD medium 2002.

Figure 21:
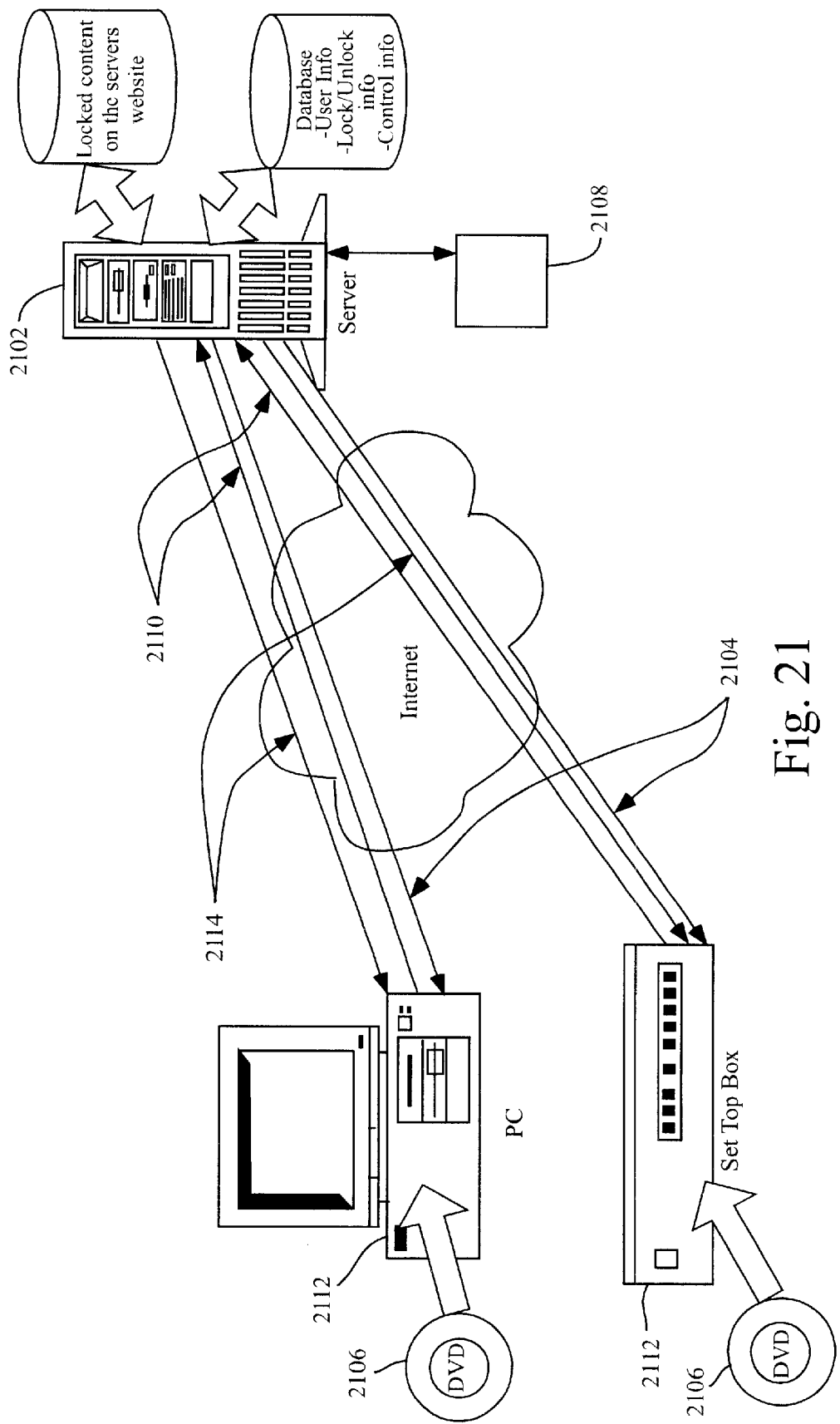
FIG. 21 is a schematic diagram illustrating an embodiment of the present invention.

With reference to FIG. 21, this control is performed by a transaction sever 2102 which sends video playback commands 2104 such as play stop, FF, Rewind, etc. It can also provide a locking/unlocking scheme which allows content on a local disk 2106 or website to be protected and accessible to particular users at prescribed points in time through a locking and unlocking process. This locking/unlocking technology could be broken down into two possible embodiments. For example, one such embodiment allows for unlocking local content that is on a local disk (i.e. DVD Disc) 2106 based on a user profile for example. In addition this content access could also expire or be accessible only during a particular time frame. Another possible embodiment allows for unlocking content on a website 2108 by requiring the user to have a DVD Disc in his computer's disc drive or set top box. (Therefore the user had to purchase the disk to get access to the on-line content).

This locking and unlocking is accomplished through the transaction server 2102, which validates the credentials of the user. These credentials 2110 are passed from the client 2112 (PC or set top box) and the server returns for example the unlock sequence 2114 to the client. In the case of DVD Video this unlock sequence can be in the form of General Purpose Registers Values (GPRM Bits) that unlock the content. In the case of the website the client 2112 could pass the current disc 2106 in the drive's unique disc ID or BCA number and the transaction server 2102 allows a redirection to protected content after validation takes place. This unlocked content could be local or on the website 2108.

The advantages of remote control of a client's video device from a server is that the content can be protected. Since the information to use it is stored remotely, it can be easily maintained and upgraded, and allows introduction of new products without affecting the already shipped content (DVD Video). In addition, the control can be of a single client or many users. For example, with the ability to unlock content you can allow content to be accessible at a particular point in time thus allowing a special "event" or promotional time to occur and also allowing for various advertising/promotional models. The concept of expiring content is also useful, for example if an offer is only valid till the end of the year. The user is not burdened with viewing advertising or offers that they cannot participate in anyway after they have expired.

Another example is to reward users for purchasing particular products or even registering their products. The user can then be provided with additional content that is unlocked on the disc. In addition we can verify that people have the correct credentials before accessing content. To explain this further there may be website material that should only be accessible to customers who have purchased a particular DVD. The website may have additional information, games, or special items to be purchased and offered and this should only be made available to people who have purchased the DVD product. This may also span across multiple products for example if a user has purchased all of the available Lethal Weapon™ titles it may be desirable to give additional content to that user for having purchased the series. Another embodiment of the invention follows the DIVX DVD model wherein a client is charged on a per usage basis for the content.

The present invention can also provide for remote navigation of content on a local server. For example navigation commands 2104 (FIG. 21) for left, right, up, down can be sent from the server to set General Purpose Registers (GPRMs) in the DVD Player that allowed content to be unlocked and viewed by users during the event. In addition, DVD navigation commands can be sent through streamed audio with embedded triggers that send DVD navigation commands that call the video object in the web page.

Figure 22:
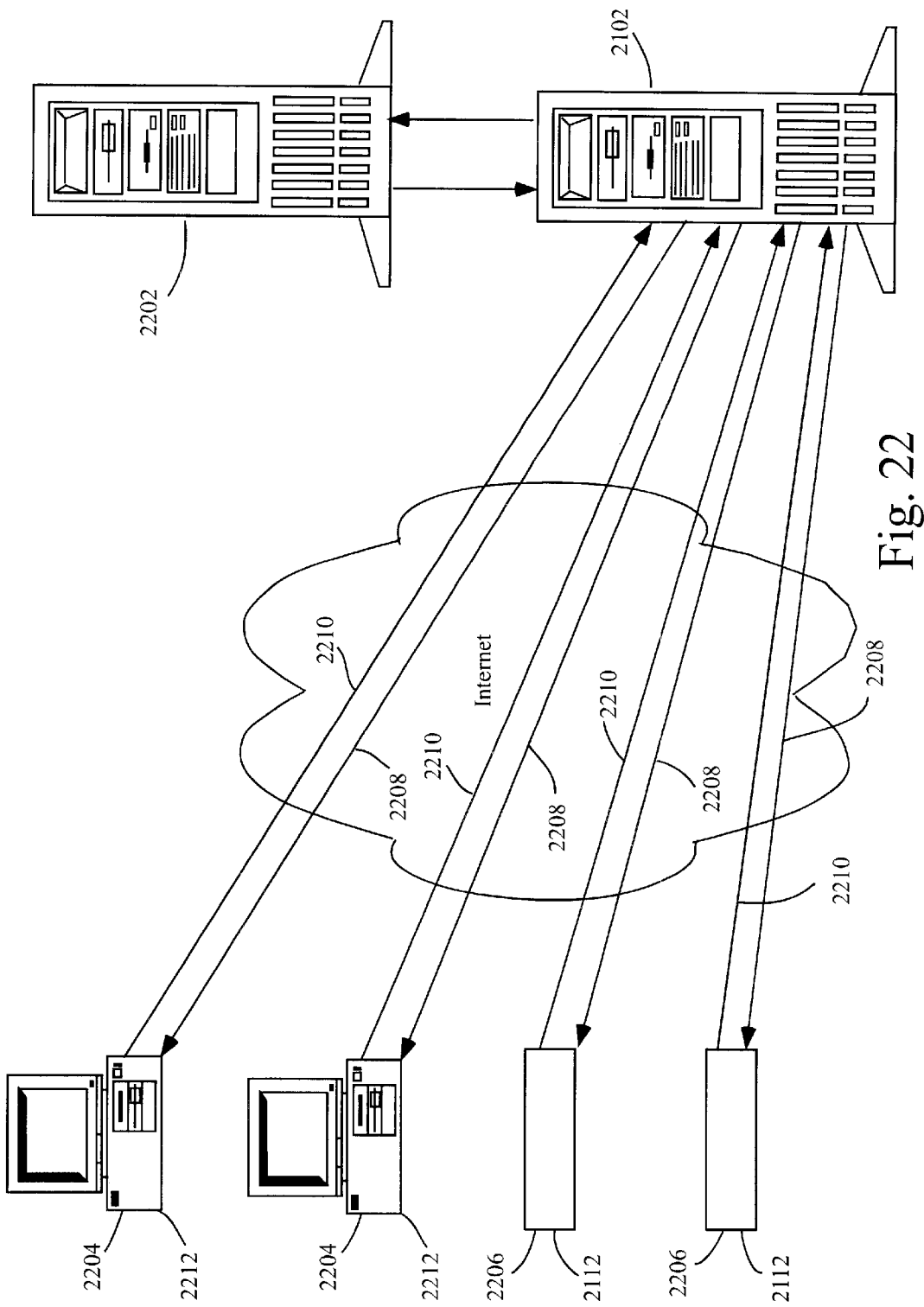
FIG. 22 is a schematic diagram illustrating another embodiment of the present invention.

In addition, With reference to FIG. 22, a synchronization server 2202 can be used to send commands to initiate video play in synchronization with several users 2112. Control can be of one or multiple clients in the form of PCs 2204 or set top players 2206. The remote navigation commands 2208 allow the server to tell the client what to do. The same set of commands can be sent to each of the clients—thus synchronizing the viewing experience. They could also be different, for example each user could be viewing a different DVD and therefore experiencing a different set of content. Based on the users profile 2210 they can also have access to different content. Given a geographical location or native language the control maybe tailored accordingly. The control of the video can be as simple as play, stop, fast forward, rewind, etc. or can include advanced features such as pan, zoom, rotate etc. The type of navigation/control can be divided into 3 aspects:

Commands. Commands control the playback and search mechanisms of a DVD-Video disc. (These can be issued from the server or the client)

Properties. Properties are used to query attributes of the DVD-Video and set certain configuration properties. (These can be queried from the server or the client). An example is to get the current state or title/chapter/time of the DVD Video). Another example is to tell the user whether or not he or she is on a menu.

Events. Events are used to trigger notification of various playback conditions, such as time changes, title changes and UOP changes. Events are essential for scripting and synchronizing the video with other assets. (these are sent from the content or client back to the server. They can indicate that the video has stopped playing, you are on a menu item, or the number to angles available in the video has changed.

Embodiment In a Web Page

Figure 23:
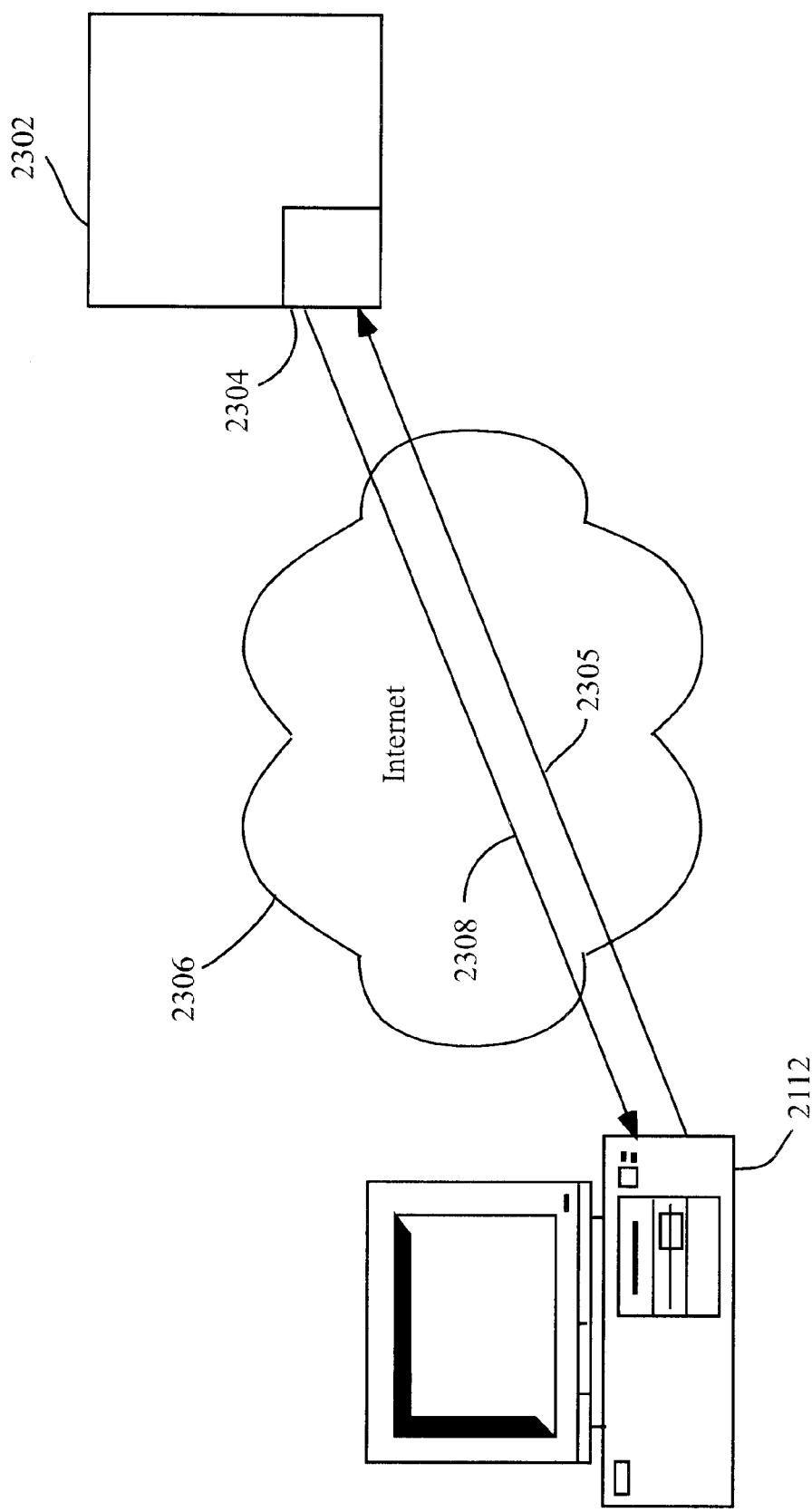
FIG. 23 is a schematic diagram illustrating yet another embodiment of the present invention.

With reference to FIG. 23, an embodiment of this invention provides control of content through a web page 2302. Using a browser as the client interface (Such as Internet Explorer) the user can browse to the page 2302 on-line that contains an Active-X Control that has an embedded video object 2304. The client sends identification information and/or requests 2305 to the web page over the Internet 2306. In response, the video object 2304 activates video navigation commands to play and/or unlock sequences 2308 required to play the video.

Figure 24:
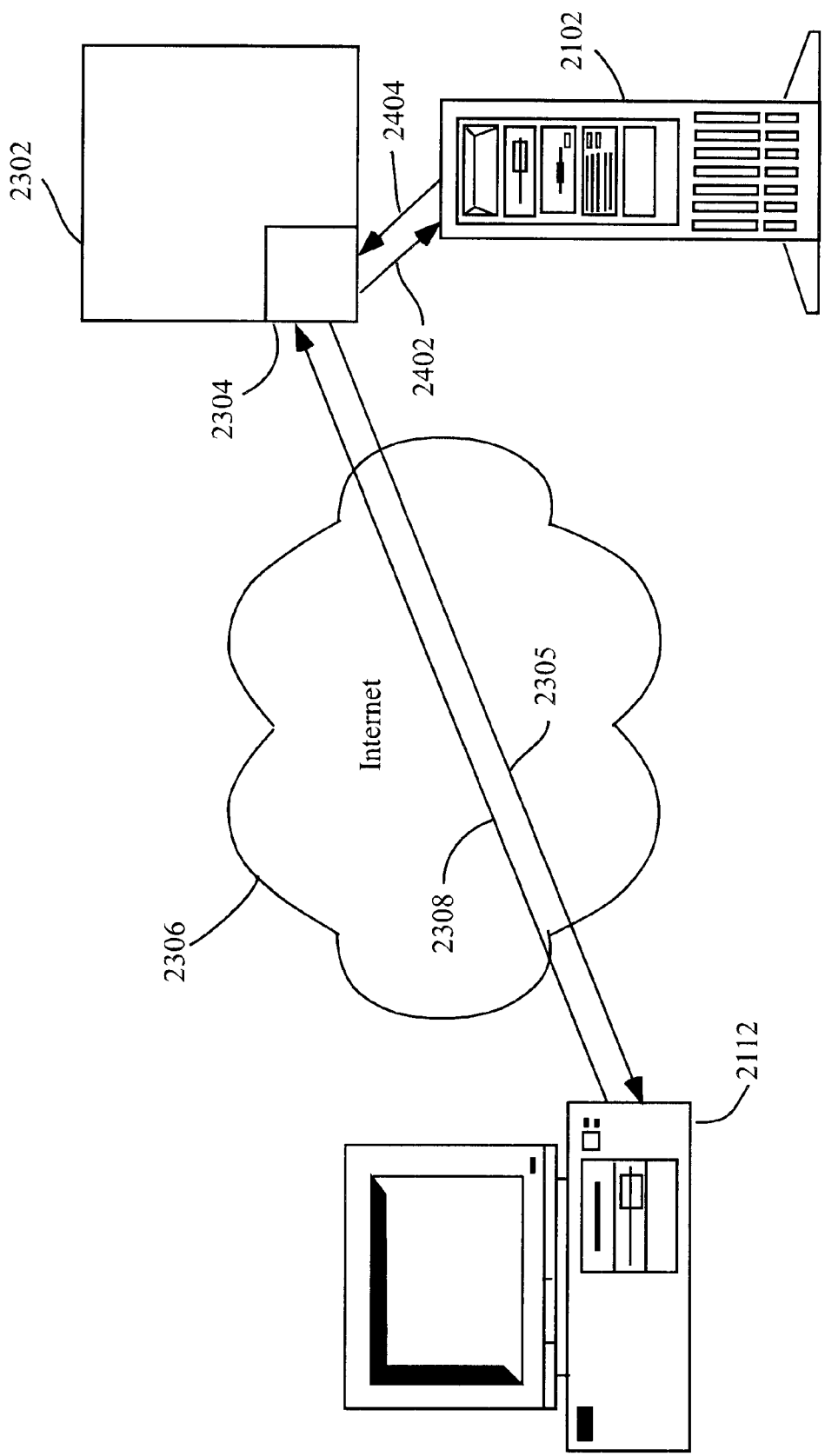
FIG. 24 is a schematic diagram illustrating still another embodiment of the present invention.

With reference to FIG. 24, in another embodiment of the invention the Video Object 2304 opens a secondary connection 2402 to the transaction server 2102 to receive commands 2404 from the server to execute.

In another form the browser interprets http commands for the control of video. The web page on the server is viewed by the client and when the user selects an item in the web page the HTTP link can be formatted with parameters for the browser to interpret directly for video playback.

For example http://iti video? command=Play

This is interpreted by the browser since it has an iti_video in the url and then parses the parameters, which in this case is the command to play.

Examples of embedding a Video Object in a Web Page

DVD-Video can be embedded within a HTML page and control its layout. Computer operating systems can embed DVD-Video using currently available embedding techniques. By way of example, each of the major computer operating systems is provided below:

| Operating System | Example |
|---|---|
| Windows | <object ID=" Video Object"<br>CLASSID="clsid:A0739DE5-571F-11D2-A031-0060977F760C"<br>BORDER="1" WIDTH=50% HEIGHT=60%><br></object> |
| Apple/Macintosh | <embed ID=" Video Object"<br>TYPE="application/x- Video Object -plugin"<br>ALT=" Video Object Plug In"<br>HIDDEN="TRUE"><br></embed> |
| Linux | TBD |
| Others | TBD |

After the DVD-Video object is embedded in the web page, it can be accessed using any style sheet, link, or scripting language. Values for the IDstring must begin with a letter (A-Z or a-z) and may be followed by any number of letters, digits, hyphens, and periods up to a maximum of 48.

Unlike computers, set-top boxes do not generally have a full-blown operating system and browser. Therefore, the capabilities within the browser are often more restricted. For embedding DVD-Video within these platforms using ITX, the "Video Object" ID must be integrated within the embedded browser as any other tag structure. With this approach, any embedded browser that encounters the "Video Object" tag, would automatically associate this identifier.

Unlocking Implementation

Figure 25:
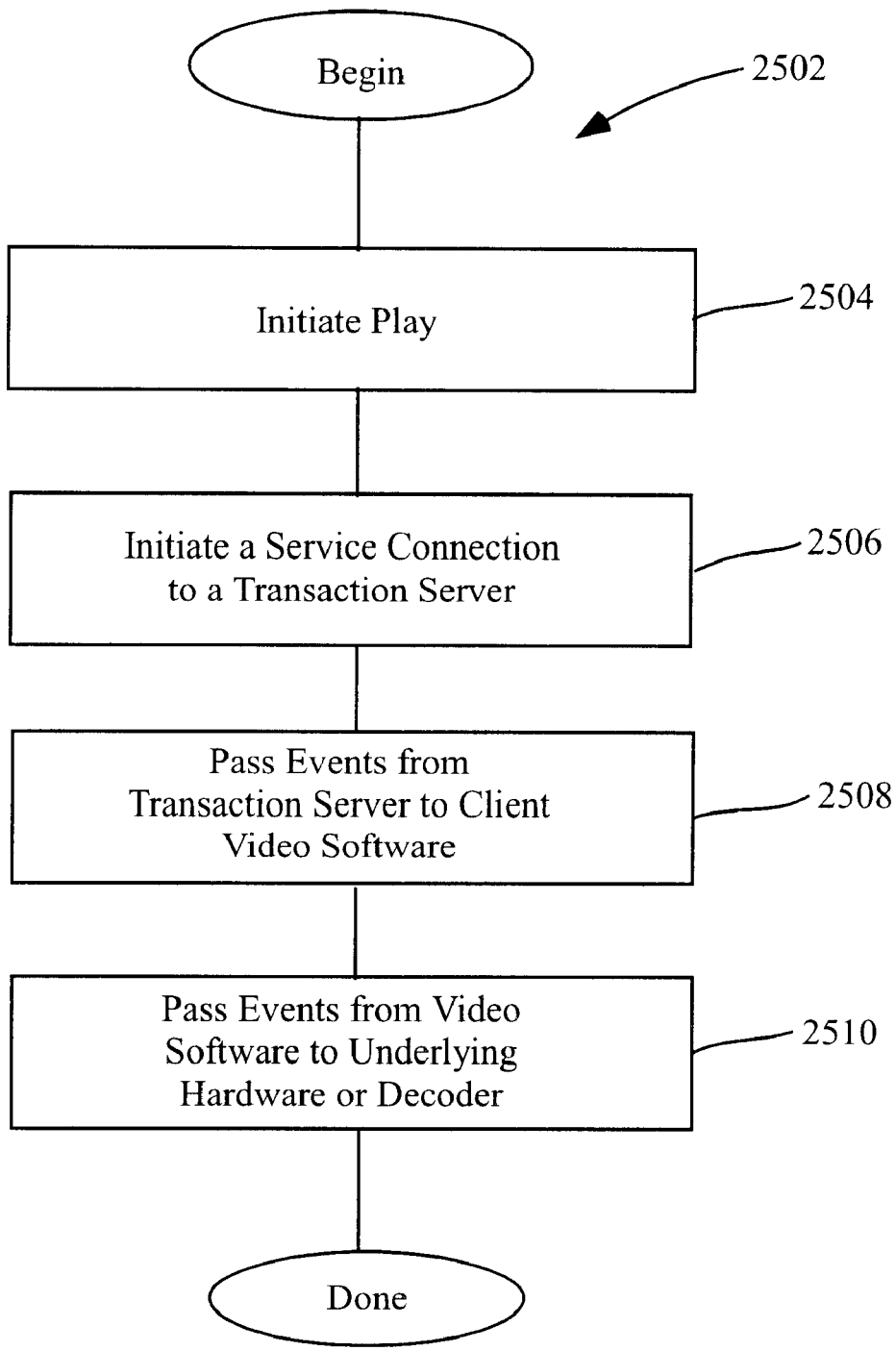
FIG. 25 is a flowchart illustrating a method for carrying out the present invention.

Another embodiment of the invention provides a system and method for unlocking portions of DVD-Video based on certain criteria (date, profile, BCA, etc.). To control playback of video, the video can be "locked" so that the consumer must perform certain steps to access and play the video. The steps that trigger the unlock should be controlled by the content owner and can be based on date, consumer profile, BCA number or any other criteria, and should be controllable over the Internet from a remote server. (Although it is possible to store the unlock sequence locally as well). With reference to FIG. 25, a method 2502 is provided for controlling content. The method 2502 begins with a step 2504 wherein a user tries to play a portion of DVD-Video from application or web page. In a step 2506, video software initiates a secure connection to a transaction server that authenticates the user, and then passes the correct unlock sequence of events back to the video software. This video software is preferably stored locally on the user's computer or, more preferably, on the disk on which the video content is stored. In a step 2508, the events are passed from the server, and then in a step 2510 are then passed by the video software directly to the underlying hardware or software DVD decoder, thereby bypassing any user knowledge of the events. This approach requires certain DVD-Video authoring requirements: (1) interleaving video and audio streams to prevent "back door" playback/access; (2) ability to populate GPRMs to create locking sequence.

There are two parts to the DVD-Video unlocking mechanism:

The actual unlock process—performs actual unlocking of video. Without unlock process, consumer cannot access video. Therefore software on the remote server is required to unlock the video and other players will not support this feature.

The protection process—the process protects against malicious consumers who try to bypass unlocking process. This process is not an actual locking process, but manipulates and distorts the video, thus rendering it non-viewable by consumers that try to bypass the unlock mechanism.

Unlock Process

The locking process is performed during the video authoring process of the DVD-Video. Each portion of video to be unlocked can be authored into a separate title, or title/chapter combination. (All references to locking video also apply to locking DVD-Audio)

The locking of the video utilizes General Parameter Registers (GPRMs), which are inherent in the DVD-Video specification. A DVD-Video title can be authored such that the GPRMs must be set to a specific value in order to allow an action to occur. In the case of our video unlocking scheme, the process of locking a video is ensuring that a video can only be played when the GPRMs are properly set. Then the DVD-Video is authored in such a way that remote server operator can programmatically (without consumer interaction) set the value of the GPRMs when certain conditions/transaction criteria has been met.

Figure 26:
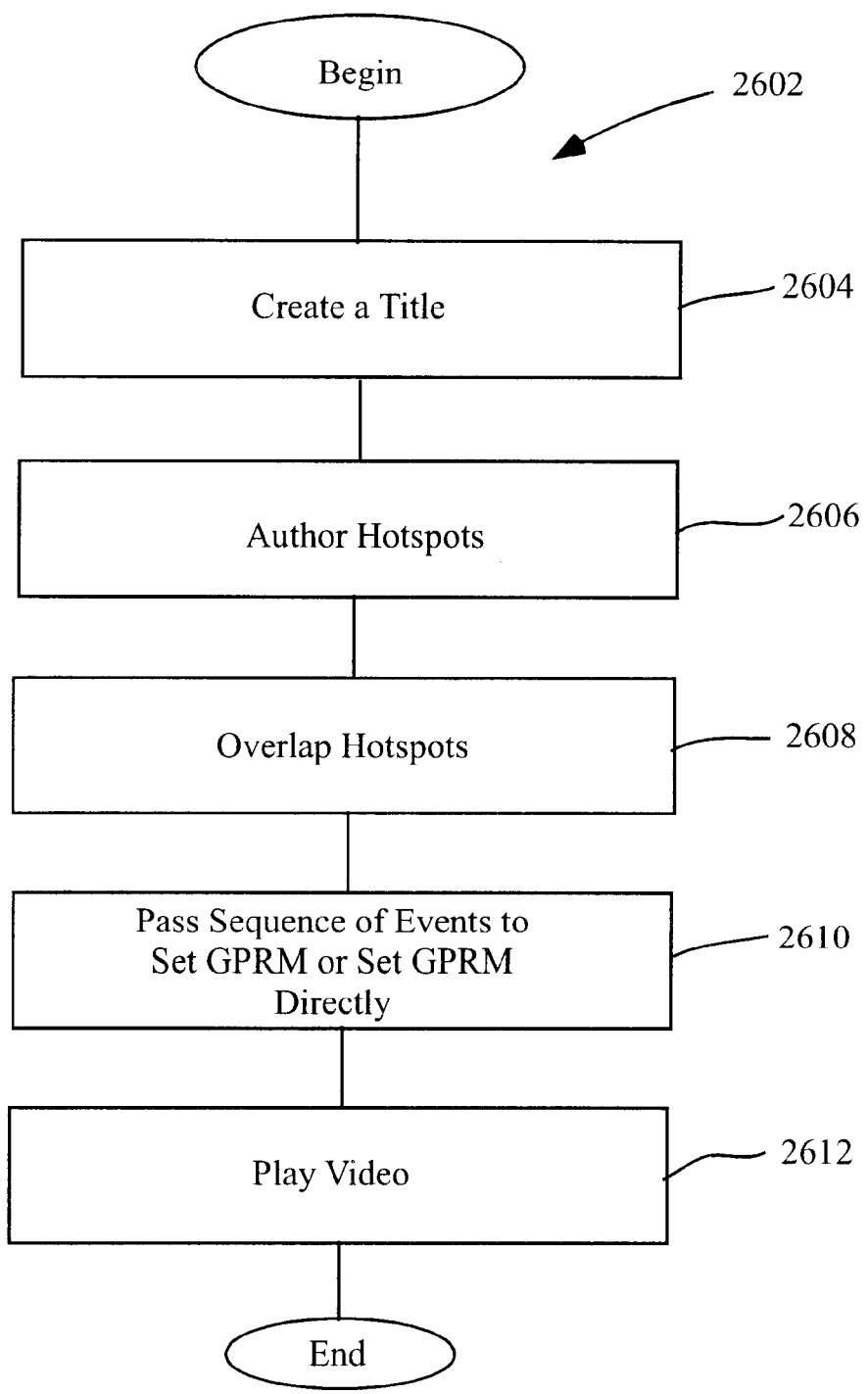
FIG. 26 is a flowchart illustrating a method for carrying out an aspect of the present invention.

FIG. 26 illustrates a method 2602 for unlocking content. The steps required to create the "lock" or "key" for unlocking begin with a step 2604 of creating a title, the title being some form of content such as a movie video, training video or some other form of content. Thereafter, in a step 2606 hot spots are authored in the title (or use post command and jump to menu that contains hot spots). Then, in a step 2608, all of the hotspots are overlapped. In a step 2610 a sequence of events that trigger GPRMs is passed to the client. Once correct sequence of events are passed to client, resulting in populating the GPRMs properly, then, in a step 2612 the consumer is allowed to play the locked video.

Once correct GPRMs are populated, the appropriate post command is generated to jump the consumer to the locked title. Also note the GPRMs can be populated by either a direct call to an interface that allows setting the GPRM bits or through menu navigation commands such as left, right, up, and down.

It is also recommended to create a TIFF or animated graphic that displays when the DVD is placed into a traditional DVD consumer player. This TIFF or animated graphic can inform the user to place the DVD into a computer to access the special features and unlock the appropriate content. This information is displayed as soon as the First Play PGC is encountered.

Figure 27:
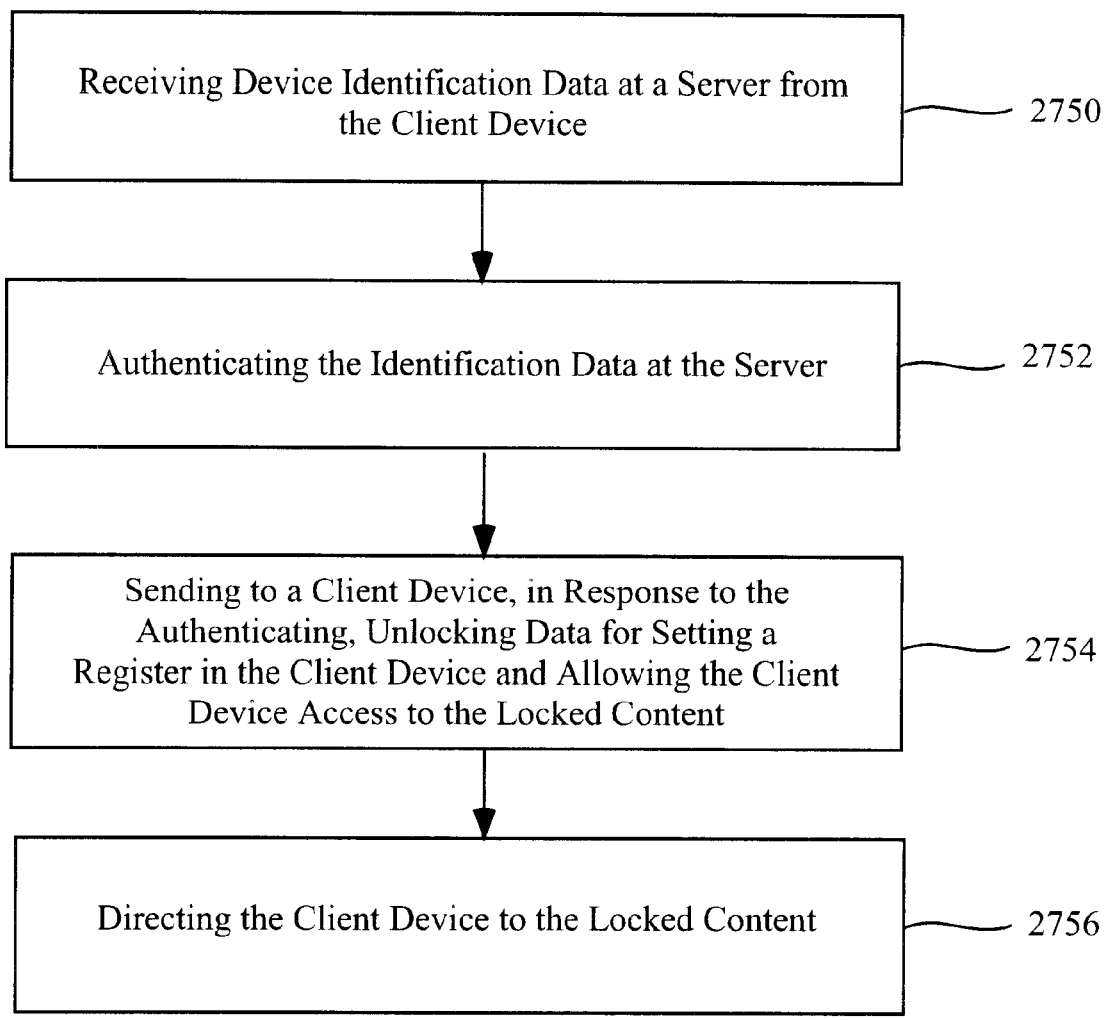
FIG. 27 is a flowchart illustrating one embodiment of steps carried out by a server when remotely unlocking local content.

Referring next to FIG. 27, shown is a flowchart illustrating one embodiment of steps carried out by a server when remotely unlocking local content. Initially, the server, e.g., transaction server 2102, receives device identification data from a client device, e.g., client 2112 (PC or set top box)(Step 2750). The identification data in some embodiments is associated with information in the Burst Cut area of a local disk, e.g., local disk 2106. Next, the server authenticates the identification data at the server to determine whether the client device should have access to the locked content (Step 2752). In response to authenticating the identification data, the server sends to the client device unlocking data for setting a register in the client device and allowing the client device access to the locked content (Step 2754). In several embodiments, the locked content has been authored such that when the register is set to a specific value a post command is generated in the client device that directs the client device to the locked content (Step 2756).

Protection Process

To avoid DVD playback solutions that violate the DVD-Video guidelines, additional precautions should be taken (these are not required, but recommended):

Each section of video (title or chapter) to be locked should be interleaved with another portion of video (such as black, or with a second video to be locked. Since this requires the use of multi-angle content, the two sections of video must be of the exact length. This avoids certain decoders which ignore the DVD-Video layout and allow the consumer to play a VOB file directly. The first/default video stream (angle 1) should be the black, dummy video. The second video stream (angle 2) should be the actual content to be unlocked.

Each section of video to be locked should contain two audio tracks: the first/default audio track should be noise, garbage or any audio that is NOT associated with the content to be unlocked. This is the default audio track that will be played if the consumer attempts to bypass the DVD-Video specification. The second audio track should be the actual audio track for the locked video.

This protection process is useful because interlaced/multi-angle video is formatted out sequentially. In other words, interlaced content is stored in the following manner: Seconds 0–2 video 1, seconds 0–2 video 2, seconds 3–5 video 1, seconds 3–5 video 2, etc. Therefore if a consumer attempts to play the underlying VOB file directly, they will see video alternating every two seconds—which is very annoying. Additionally, if a VOB file is played using this approach, the default audio stream will play, which as defined above, will be garbage.

If utilizing these protection processes: after unlock process has completed successfully, the DVD-Video should be authored to play the appropriate title/chapter combination, as well as defaulting to the second video stream (angle 2) and second audio stream (audio track 2). Relate to BCA based on distribution channel allow access to content.

Control is on the Server side and it controls the client. Therefore server can give commands for content. The server can also create a game out of the navigation if they view certain clips in a certain order they will essentially be walking through a key setting scheme and thus unlocking further content. The Unlock information on a web site by requiring a DVD to be in the drive. The BCA number or Disk ID is passed to the website in the HTTP header and then this allows the content on the website to be accessed.

While various embodiments have been described above, it should be understood that they have been presented by way of example only, and not limitation. Thus, the breadth and scope of a preferred embodiment should not be limited by any other the above described exemplary embodiments, but should be defined only in accordance with the following claims and their equivalents.

What is claimed is:

1. A method for remotely allowing access to locked content stored locally at a client device, the method comprising:

receiving device identification data at a server;

authenticating the identification data at the server;

sending to a client device, in response to the authenticating, unlocking data for setting a register in the client device and allowing the client device access to the locked content;

wherein the locked content has been authored such that when the register is set to a specific value a post command is generated in the client device that directs the client device to the locked content.

2. The method of claim 1 wherein the register is a General Purpose Register.

3. The method of claim 1 further comprising sending to the client device a navigation command for setting the General Purpose Register.

4. The method of claim 1 wherein the client device is a computer.

5. The method of claim 1 wherein the client device is a set top box.

6. The method of claims 1 wherein the identification includes information about the client device.

7. The method of claim 1 wherein the identification data includes information about the user.

8. The method of claim 1 further comprising sending to the client device additional unlocking data for setting additional registers in the client device and allowing the client device access to additional locked content.

9. The method of claim 8 wherein the additional registers are General Purpose Registers.

10. The method of claim 1 further comprising receiving from the client device Burst Cut Area information.

11. A computer program embodied on a computer-readable medium for remotely allowing access to locked content stored locally at a client device comprising:

a source code segment for receiving an identification from the client device;

a source code segment for determining whether the client device should have access to the locked content, the locked content being previously authored such that access will be granted if a register in the client device is properly set; and a source code segment for sending unlocking information to the client device, wherein the unlocking information sets the register in the client device, allowing for a proper post command to be generated in the client device.

12. The computer program as in claim 11 wherein the register is a General Purpose Register in the client device.

13. The computer program as in claim 12 further comprising a source code segment for sending a navigation command to the client device to set the General Purpose Register.

14. The computer program as in claim 12 further comprising a source code segment for directly setting the General Purpose Register in the client device.

15. The computer program as in claim 11 further comprising a code segment for unlocking content stored on a Digital Versatile Disc.

16. A method for unlocking content for display at a client device comprising:

receiving from the client device information data from a Burst Cut Area;

determining at a server whether the client device should have access to the content based upon the information data from the Burst Cut Area; and sending an unlock command over a network to the client device to allow for the display of the content.

17. The method of claim 16 further comprising setting registers in the client device.

18. The method of claim 17 wherein the registers are General Purpose Registers.

19. The method of claim 16 wherein the content is a web-site.

20. The method of claim 16 wherein the content is data stored on a Digital Versatile Disc.

21. The method of claim 16 wherein the Burst Cut Area contains information identifying a specific copy of a disc.

22. The method of claim 21 further comprising querying a database to identify a user who purchased the specific copy of the disc.

23. A computer program embodied on a computer-readable medium for remotely allowing access to locked content comprising:

a source code segment for receiving information from a client device, the information based on data in a Burst Cut Area;

a source code segment for determining whether the client device should have access to the locked content based on the information received; and a source code segment for sending unlocking information to the client device.

24. The computer program as in claim 23 further comprising:

a source code segment for receiving client identification data for identifying the client device; and a source code segment for determining whether the client device should have access to the locked content based on the client identification data.

25. The computer program as in claim 23 further comprising a source code segment for unlocking content stored on a Digital Versatile Disc.

26. The computer program as in claim 23 further comprising a source code segment for setting registers in the client device.

27. The computer program as in claim 26 wherein the registers are General Purpose Registers.

28. The computer program as in claim 23 further comprising a source code segment for sending menu navigation commands to the client device.

* * * * *